(12) United States Patent
Mimura et al.

(10) Patent No.: US 12,486,458 B2
(45) Date of Patent: Dec. 2, 2025

(54) LIQUID CRYSTAL COMPOSITION, LIQUID CRYSTAL CURED LAYER, OPTICAL FILM, POLARIZING PLATE, AND IMAGE DISPLAY DEVICE

(71) Applicant: FUJIFILM Corporation, Tokyo (JP)

(72) Inventors: Tomonori Mimura, Kanagawa (JP); Akio Tamura, Kanagawa (JP); Hiroyuki Hagio, Kanagawa (JP); Yuta Fukushima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/612,685

(22) Filed: Mar. 21, 2024

(65) Prior Publication Data

US 2024/0240086 A1 Jul. 18, 2024

Related U.S. Application Data

(63) Continuation of application No. PCT/JP2022/035363, filed on Sep. 22, 2022.

(30) Foreign Application Priority Data

Sep. 29, 2021 (JP) ................................. 2021-159033
May 19, 2022 (JP) ................................. 2022-082229

(51) Int. Cl.
| | | |
|---|---|---|
| *G02F 1/1333* | (2006.01) | |
| *C09K 19/34* | (2006.01) | |
| *C09K 19/38* | (2006.01) | |
| *C09K 19/04* | (2006.01) | |

(52) U.S. Cl.
CPC ...... *C09K 19/3823* (2013.01); *C09K 19/3491* (2013.01); *C09K 2019/0448* (2013.01)

(58) Field of Classification Search
CPC C09K 19/38; C09K 19/3823; C09K 19/3491; C09K 19/3497; C09K 19/52; C09K 19/54; C09K 2019/0448; C09K 2019/528; G02F 1/1333; G02F 1/1335; G02F 1/13363

See application file for complete search history.

(56) References Cited

U.S. PATENT DOCUMENTS

| | | | |
|---|---|---|---|
| 2016/0200981 A1 | 7/2016 | Lee et al. | |
| 2018/0117888 A1 | 5/2018 | Fukagawa et al. | |
| 2020/0115480 A1 | 4/2020 | Fukagawa et al. | |
| 2022/0106524 A1* | 4/2022 | Okusa | C09K 19/601 |
| 2023/0090038 A1 | 3/2023 | Hatase et al. | |
| 2024/0240086 A1* | 7/2024 | Mimura | G02F 1/13363 |

FOREIGN PATENT DOCUMENTS

| | | | |
|---|---|---|---|
| JP | 11-148080 A | 6/1999 | |
| JP | 2015-120861 A | 7/2015 | |
| JP | 6398639 B2 | 10/2018 | |
| WO | 2017/002847 A1 | 1/2017 | |
| WO | 2018/003664 A1 | 1/2018 | |
| WO | 2019/003860 A1 | 1/2019 | |
| WO | 2019/235108 A1 | 12/2019 | |
| WO | WO-2021002333 A1 * | 1/2021 | C09K 19/56 |
| WO | 2021/131726 A1 | 7/2021 | |

OTHER PUBLICATIONS

International Search Report issued in PCT/JP2022/035363 on Dec. 6, 2022.
Written Opinion issued in PCT/JP2022/035363 on Dec. 6, 2022.
International Preliminary Report on Patentability completed by WIPO on Apr. 2, 2024 in connection with International Patent Application No. PCT/JP2022/035363.
Office Action, issued by the Korean Intellectual Property Office on Apr. 17, 2025, in connection with Korean Patent Application No. 10-2024-7006932.

* cited by examiner

*Primary Examiner* — Geraldina Visconti

(74) *Attorney, Agent, or Firm* — Edwards Neils LLC; Jean C. Edwards, Esq.

(57) ABSTRACT

A liquid crystal composition capable of forming a liquid crystal cured layer with suppressed cissing during formation of a liquid crystal cured layer and excellent alignment properties, a liquid crystal cured layer, an optical film, a polarizing plate, and an image display device. The liquid crystal composition includes a liquid crystal compound and a surfactant, in which the surfactant is a copolymer having a repeating unit A including two or more silicon atom-containing groups each having three substituents and a repeating unit B including two or more ring structures consisting of a cycloalkane ring or a monocyclic aromatic ring in which at least one of the ring structures consists of a monocyclic aromatic ring.

10 Claims, 1 Drawing Sheet

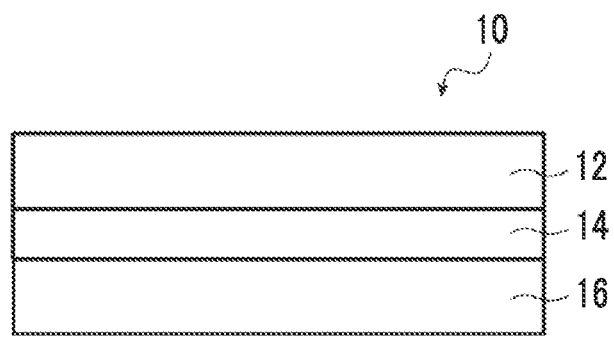

LIQUID CRYSTAL COMPOSITION, LIQUID CRYSTAL CURED LAYER, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2022/035363 filed on Sep. 22, 2022, which was published under PCT Article 21(2) in Japanese, and which claims priority under 35 U.S.C. § 119(a) to Japanese Patent Application No. 2021-159033, filed on Sep. 29, 2021, and Japanese Patent Application No. 2022-082229, filed on May 19, 2022. The above applications are hereby expressly incorporated by reference, in their entirety, into the present application.

BACKGROUND OF THE INVENTION

1. Field of the Invention

The present invention relates to a liquid crystal composition, a liquid crystal cured layer, an optical film, a polarizing plate, and an image display device.

2. Description of the Related Art

Optical films such as an optical compensation sheet and a phase difference film are used in various image display devices from the viewpoint of image coloration elimination, viewing angle expansion, and the like.

A stretched birefringence film has been used as an optical film. However, in recent years, it has been suggested to use a retardation layer (liquid crystal cured layer) formed of a liquid crystal compound in place of the stretched birefringence film.

Further, an optical film is usually required to have a uniform thickness in a plane. In order to achieve such a uniform thickness, in a case where a base material is coated with a liquid crystal composition, the coating is required to be made uniformly.

It is known that a liquid crystal composition containing a surfactant is used in order to uniformly perform coating as described above.

For example, JP6398639B discloses the use of a composition for forming a retardation layer (liquid crystal composition), which contains a liquid crystal compound, a surfactant consisting of a polyether-modified silicone having a predetermined repeating unit, and a solvent ([Claim 1]).

SUMMARY OF THE INVENTION

As a result of examination on the liquid crystal composition and the liquid crystal cured layer described in JP6398639B, the present inventors found that cissing occurs during formation of the liquid crystal cured layer depending on the structure of the surfactant contained in the liquid crystal composition, and the alignment properties of the liquid crystal cured layer to be formed are degraded.

Therefore, an object of the present invention is to provide a liquid crystal composition capable of forming a liquid crystal cured layer with suppressed cissing during formation of a liquid crystal cured layer and excellent alignment properties, a liquid crystal cured layer, an optical film, a polarizing plate, and an image display device.

As a result of intensive examination conducted by the present inventors in order to achieve the above-described object, it was found that a liquid crystal cured layer with suppressed cissing during formation of the liquid crystal cured layer and excellent alignment properties can be formed by blending a predetermined surfactant with a liquid crystal composition that forms the liquid crystal cured layer, thereby completing the present invention.

In other words, it has been found that the above-described object can be accomplished by employing the following configurations.

[1] A liquid crystal composition comprising a liquid crystal compound; and a surfactant, in which the surfactant is a copolymer having a repeating unit A including two or more structures each represented by Formula (Ia) which will be described later and a repeating unit B including two or more ring structures consisting of a cycloalkane ring or a monocyclic aromatic ring in which at least one of the ring structures consists of a monocyclic aromatic ring.

[2] The liquid crystal composition according to [1], in which both the repeating unit A and the repeating unit B are repeating units including a structure represented by Formula (Ib) which will be described later.

[3] The liquid crystal composition according to [1] or [2], in which the repeating unit A is a repeating unit represented by Formula (a1) which will be described later.

[4] The liquid crystal composition according to any one of [1] to [3], in which the repeating unit B is a repeating unit represented by any one of Formulae (b1) to (b4) which will be described later.

[5] The liquid crystal composition according to [4], in which $Ph^1$ in Formula (b1) which will be described later represents a naphthyl group which may have a substituent.

[6] The liquid crystal composition according to [4], in which $M^1$ in Formulae (b2) and (b3) which will be described later represents a mesogenic group represented by Formula (M1-A) which will be described later.

[7] The liquid crystal composition according to any one of [1] to [6], in which the repeating unit A includes three or more of the structures each represented by Formula (Ia) which will be described later.

[8] The liquid crystal composition according to any one of [1] to [7], in which all $R^{11}$, $R^{12}$, and $R^{13}$ in Formula (Ia) which will be described later represent an alkyl group.

[9] The liquid crystal composition according to any one of [1] to [8], in which a content of the repeating unit A included in the copolymer is 50% to 90% by mass with respect to a total mass of the repeating unit A and the repeating unit B.

[10] The liquid crystal composition according to any one of [1] to [9], in which a weight-average molecular weight of the copolymer is 10,000 or more and 40,000 or less.

[11] The liquid crystal composition according to any one of [1] to [10], in which the liquid crystal compound is a polymerizable liquid crystal compound.

[12] The liquid crystal composition according to [11], in which the polymerizable liquid crystal compound is at least one polymerizable liquid crystal compound selected from the group consisting of a polymerizable rod-like liquid crystal compound and a polymerizable disk-like liquid crystal compound.

[13] A liquid crystal cured layer obtained by immobilizing an alignment state of the liquid crystal composition as described in any one of [1] to [12].

[14] An optical film comprising the liquid crystal cured layer according to [13].

[15] A polarizing plate comprising the optical film according to [14] and a polarizer.

[16] An image display device comprising the optical film according to [14] or the polarizing plate according to [15].

According to the present invention, it is possible to provide a liquid crystal composition capable of forming a liquid crystal cured layer with suppressed cissing during formation of a liquid crystal cured layer and excellent alignment properties, a liquid crystal cured layer, an optical film, a polarizing plate, and an image display device.

BRIEF DESCRIPTION OF THE DRAWINGS

FIG. 1 is a schematic cross-sectional view showing an example of the optical film.

DESCRIPTION OF THE PREFERRED EMBODIMENTS

Hereinafter, the present invention will be described in detail. Although the configuration requirements to be described below may be described based on representative embodiments of the present invention, the present invention is not limited to such embodiments.

In the present specification, the numerical value range expressed by "to" means that the numerical values described before and after "to" are included as a lower limit value and an upper limit value, respectively.

In addition, in the present specification, for each component, one kind of substance corresponding to each component may be used alone, or two or more kinds thereof may be used in combination.

Here, in a case where the two or more substances are used in combination for each component, the content of the component refers to the total content of the substances used in combination unless otherwise specified.

In addition, in the present specification, a bonding direction of a divalent group (for example, —O—CO—) described is not particularly limited, and for example, in a case where $L^2$ in an "$L^1$-$L^2$-$L^3$" bond is —O—CO—, and a bonding position on the $L^1$ side is represented by *1 and a bonding position on the $L^3$ side is represented by *2, $L^2$ may be *1-O—CO—*2 or *1-CO—O—*2.

In the present specification, Re($\lambda$) and Rth($\lambda$) represent an in-plane retardation and a thickness-direction retardation at a wavelength $\lambda$, respectively.

Unless otherwise specified, the wavelength $\lambda$ refers to 550 nm.

In addition, in this specification, Re($\lambda$) and Rth($\lambda$) are values measured at a wavelength $\lambda$ using AxoScan OPMF-1 (manufactured by Optoscience. Inc.).

Specifically, an average refractive index $((nx+ny+nz)/3)$ and a film thickness $(d(\mu m))$ is input to AxoScan OPMF-1 to calculate slow axis direction (°),
Re($\lambda$)=R0($\lambda$), and
Rth($\lambda$)=((nx+ny)/2−nz)×d.

Although R0($\lambda$) is displayed as a numerical value calculated by AxoScan OPMF-1, R0($\lambda$) means Re($\lambda$).

[Liquid Crystal Composition]

A liquid crystal composition according to the embodiment of the present invention is a liquid crystal composition containing a liquid crystal compound and a surfactant.

In addition, the surfactant (hereinafter, also abbreviated as "specific surfactant") contained in the liquid crystal composition according to the embodiment of the present invention is a copolymer having a repeating unit A including two or more structures (hereinafter, also abbreviated as "branched Si structure") each represented by Formula (Ia) which will be described later and a repeating unit B including two or more ring structures consisting of a cycloalkane ring or a monocyclic aromatic ring in which at least one of the ring structures consists of a monocyclic aromatic ring.

In the present invention, as described above, a liquid crystal cured layer with suppressed cissing during formation of the liquid crystal cured layer and excellent alignment properties can be formed by blending the specific surfactant with the liquid crystal composition forming the liquid crystal cured layer.

The details of the reason for this are not clear, but the present inventors presumed the reason to be as follows.

That is, it is considered that since the surface tension of the liquid crystal composition is reduced and the compatibility with the liquid crystal compound is also good in a case where the specific surfactant has the repeating unit A having two or more branched Si structures and the repeating unit B having two or more predetermined ring structures, a liquid crystal cured layer with suppressed cissing during the formation of the liquid crystal cured layer and excellent alignment properties can be formed.

Hereinafter, each of the components of the liquid crystal composition according to the embodiment of the present invention will be described in detail.

[Liquid Crystal Compound]

The liquid crystal compound contained in the liquid crystal composition according to the present invention is not particularly limited.

The type of the liquid crystal compound contained in the liquid crystal composition is not particularly limited.

Here, in general, liquid crystal compounds can be classified into a rod-like type and a disk-like type based on the shape thereof.

Furthermore, each of the types is classified into a low-molecular-weight type and a polymer type.

The term, high-molecular-weight, generally refers to having a degree of polymerization of 100 or more (Polymer Physics-Phase Transition Dynamics, by Masao Doi, page 2, published by Iwanami Shoten, Publishers, 1992).

In the present invention, any liquid crystal compound can be used, but a rod-like liquid crystal compound or a disk-like liquid crystal compound (discotic liquid crystal compound) is preferably used.

A mixture of two or more kinds of rod-like liquid crystal compounds, a mixture of two or more kinds of disk-like liquid crystal compounds, or a mixture of a rod-like liquid crystal compound and a disk-like liquid crystal compound may be used.

The liquid crystal compound is preferably a polymerizable liquid crystal compound having a polymerizable group.

The polymerizable liquid crystal compound is preferably at least one polymerizable liquid crystal compound selected from the group consisting of a polymerizable rod-like liquid crystal compound and a polymerizable disk-like liquid crystal compound.

Examples of the polymerizable group include an acryloyl group, a methacryloyl group, an epoxy group, a vinyl group, and the like.

By polymerizing a liquid crystal compound having such a polymerizable group, the alignment of the liquid crystal compound can be immobilized.

After immobilizing the liquid crystal compound by polymerization, it is no longer necessary to exhibit liquid crystallinity.

For example, those described in claim 1 of JP1999-513019A (JP-H11-513019A) or paragraphs [0026] to [0098] of JP2005-289980A are preferable as the rod-like liquid crystal compound. For example, those described in paragraphs [0020] to [0067] of JP2007-108732A or paragraphs [0013] to [0108] of JP2010-244038A are preferable as the disk-like liquid crystal compound.

In addition, a liquid crystal compound having reverse wavelength dispersibility may be used as the liquid crystal compound.

[Specific Surfactant]

The specific surfactant contained in the liquid crystal composition according to the embodiment of the present invention is a copolymer (hereinafter, also abbreviated as "specific copolymer") having a repeating unit A including two or more structures each represented by Formula (Ia) which will be described later and a repeating unit B including two or more ring structures consisting of a cycloalkane ring or a monocyclic aromatic ring in which at least one of the ring structures consists of a monocyclic aromatic ring.

<Repeating Unit A>

The repeating unit A contained in the specific copolymer is a repeating unit including two or more structures each represented by Formula (Ia).

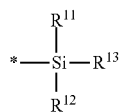

In Formula (Ia), * represents a bonding position.

In addition, $R^{11}$, $R^{12}$, and $R^{13}$ each independently represent an alkyl group, an alkenyl group, an aryl group, or an alkylenearyl group.

Here, examples of the alkyl group include a linear alkyl group having 1 to 18 carbon atoms, and a branched or cyclic alkyl group having 3 to 18 carbon atoms.

Specific examples thereof include a methyl group, an ethyl group, a propyl group, a butyl group, an isopropyl group, a tert-butyl group, and a cyclohexyl group.

Examples of the alkenyl group include an alkenyl group having 2 to 12 carbon atoms. Specific examples thereof include a vinyl group, a 1-propenyl group, a 1-butenyl group, a 1-methyl-1-propenyl group, a 1-cyclopentenyl group, a 1-cyclohexenyl group, and the like.

Examples of the aryl group include an aryl group having 6 to 12 carbon atoms.

Specific examples thereof include a phenyl group, an α-methylphenyl group, a naphthyl group, and the like.

Examples of the alkylenearyl group include an alkylenearyl group having 7 to 30 carbon atoms.

In the present invention, from the reason that the surface tension of the liquid crystal composition decreases and unevenness can be suppressed during the formation of the liquid crystal cured layer, the repeating unit A preferably includes three or more structures each represented by Formula (Ia), and more preferably includes three to six of the structures.

In addition, in the present invention, from the reason that surface tension of the liquid crystal compositions decreases and unevenness can be suppressed during formation of the liquid crystal cured layer, all $R^{11}$, $R^{12}$, and $R^{13}$ in Formula (Ia) preferably represent an alkyl group.

In the present invention, both the repeating unit A and a repeating unit B which will be described later are preferably a repeating unit including a structure represented by Formula (Ib).

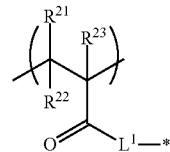

In Formula (Ib), * represents a bonding position.

In addition, $R^{21}$ and $R^{22}$ each independently represent a hydrogen atom or an alkyl group.

Furthermore, $R^{23}$ represents a hydrogen atom or a substituent.

In addition, $L^1$ represents —O— or —NR$^Z$—.

Provided that $R^Z$ represents a hydrogen atom or a substituent.

Here, examples of the alkyl group represented by one aspect of $R^{21}$ and $R^{22}$ include a linear alkyl group having 1 to 18 carbon atoms, and a branched or cyclic alkyl group having 3 to 18 carbon atoms.

Specific examples thereof include a methyl group, an ethyl group, a propyl group, a butyl group, an isopropyl group, a tert-butyl group, and a cyclohexyl group.

$R^{21}$ and $R^{22}$ are preferably a hydrogen atom.

In addition, examples of the substituent represented by one aspect of $R^{23}$ include a substituent having an alkyl group, an alkenyl group, an aryl group, or a linking group and having the structure of Formula (Ia) at a terminal.

For example, —CH$_2$—CO-L$^1$-L$^2$-(Si(R$^{11}$)(R$^{12}$)(R$^{13}$))$_m$ is also included.

$L^1$ represents —O— or —NR$^Z$.

$R^{11}$, $R^{12}$, and $R^{13}$ each independently represent an alkyl group, an alkenyl group, an aryl group, or an alkylenearyl group.

$L^2$ and m have the same definitions as in Formula (a1) which will be described later.

$R^{23}$ is preferably an alkyl group, more preferably a linear alkyl group having 1 to 4 carbon atoms, and still more preferably a methyl group or an ethyl group.

$R^{23}$ is preferably a hydrogen atom or a methyl group.

In addition, with regard to —NR$^Z$— represented by one aspect of L$^1$, the substituent represented by one aspect of R$^Z$ is preferably an alkyl group, more preferably a linear alkyl group having 1 to 4 carbon atoms, and still more preferably a methyl group or an ethyl group.

$L^1$ is preferably —O— or —NH— and more preferably —O—.

In the present invention, from the reason that while the compatibility with the liquid crystal compound is maintained, the surface tension of the liquid crystal composition decreases and unevenness can be suppressed during the formation of the liquid crystal cured layer, the repeating unit A is preferably a repeating unit represented by Formula (a1).

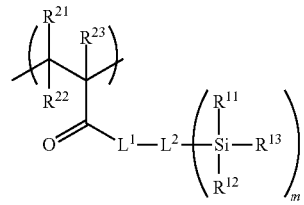

In Formula (a1), $R^{21}$, $R^{22}$, and $R^{23}$, and $L^1$ are each the same as those described in Formula (Ib).

In addition, $R^{11}$, $R^{12}$, and $R^{13}$ are each the same as those described in Formula (Ia).

Provided that a plurality of $R^{11}$'s may be the same as or different from each other, a plurality of $R^{12}$'s may be the same as or different from each other, and a plurality of $R^{13}$'s may be the same as or different from each other.

In addition, m represents an integer of 2 or more.

Furthermore, $L^2$ represents an (m+1)-valent linking group.

In Formula (a1), m is preferably an integer of 3 or more, more preferably an integer of 3 to 6, and still more preferably an integer of 3 to 5.

In Formula (a1), preferred examples of the (m+1)-valent linking group represented by $L^2$ include an (m+1)-valent hydrocarbon group having 1 to 10 carbon atoms which may have a substituent, in which some of the carbon atoms constituting the hydrocarbon group may be substituted with heteroatoms.

Here, the substituent which may be contained in the hydrocarbon group is preferably an alkyl group, more preferably a linear alkyl group having 1 to 4 carbon atoms, and still more preferably a methyl group or an ethyl group.

In addition, examples of the heteroatom include a silicon atom, an oxygen atom, and a nitrogen atom.

Specific examples of the repeating unit A include repeating units corresponding to the monomers represented by Formulae K-1 to K-22.

In Examples which will be described later, the monomer represented by Formula K-1 is referred to as a "Monomer K-1".

The same applies to other monomers.

K-1

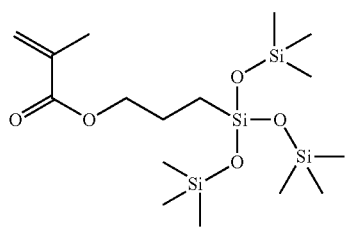

K-2

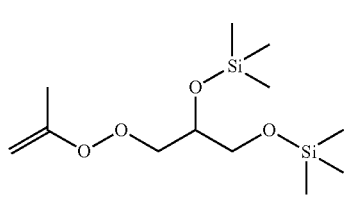

K-3

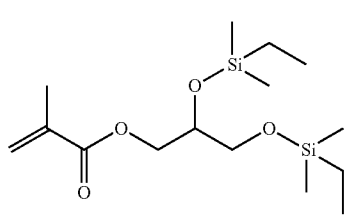

K-4

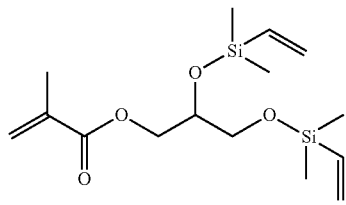

K-5

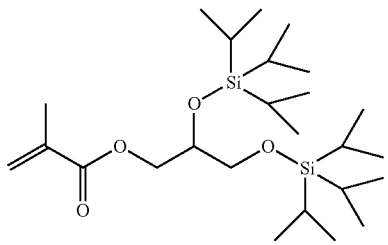

K-6

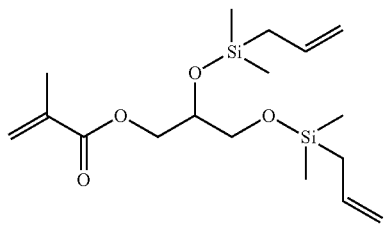

K-7

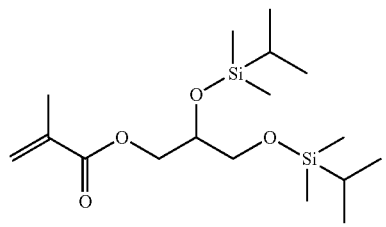

K-8

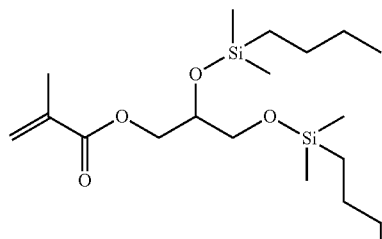

K-9

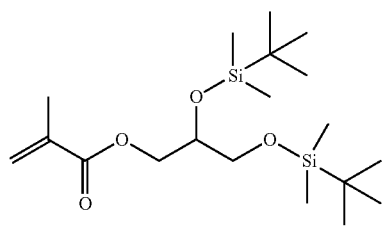

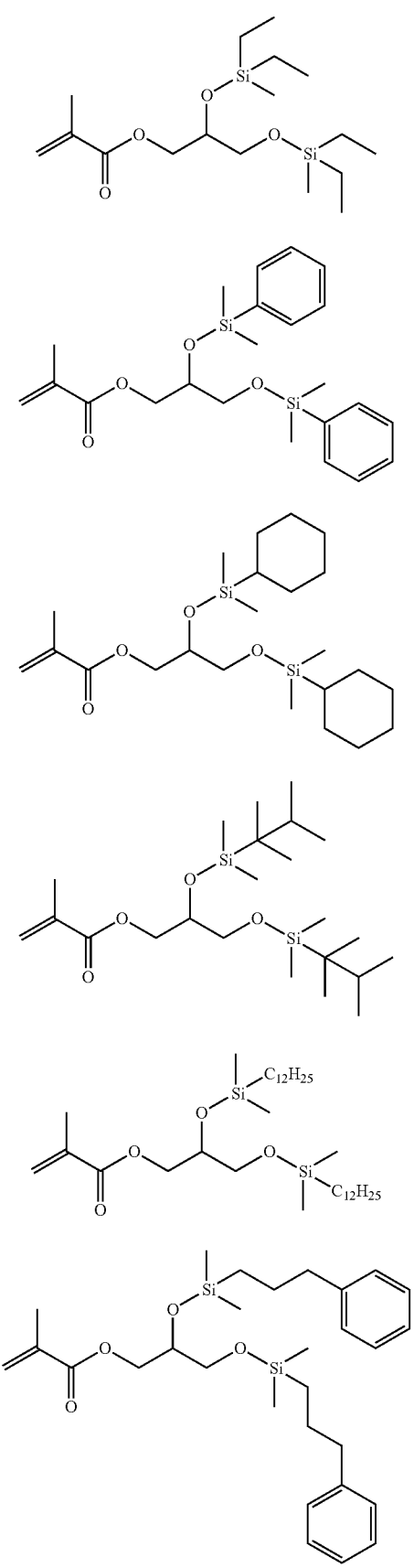
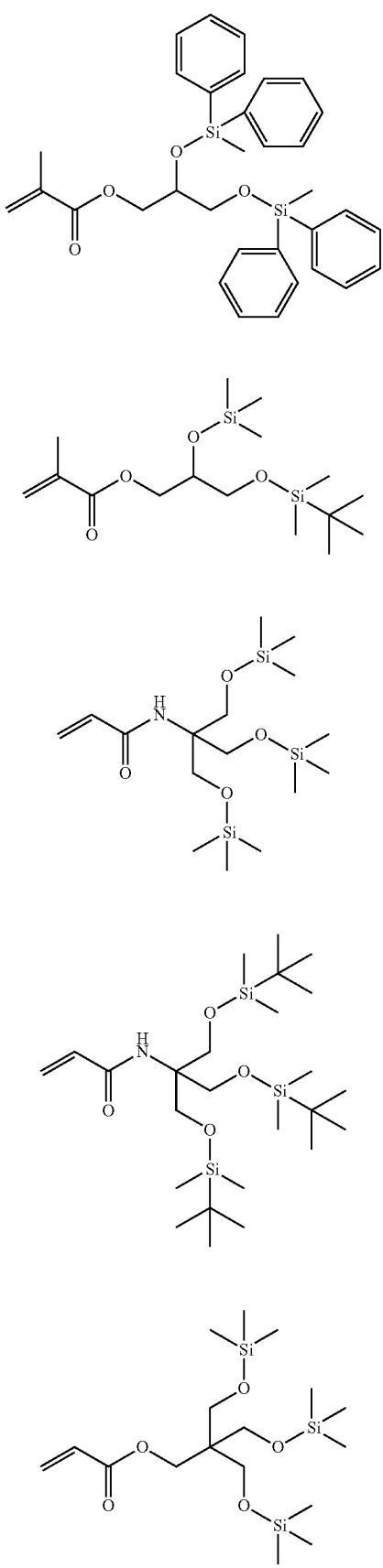

-continued

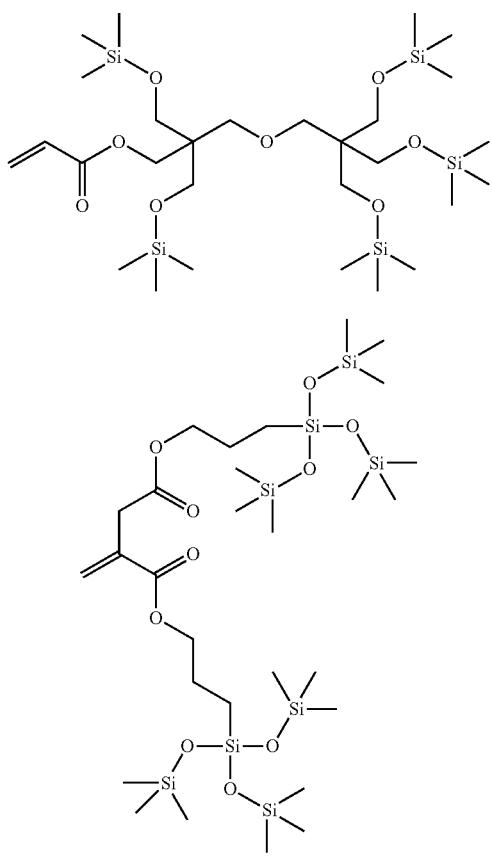

K-21

K-22

<Repeating Unit B>

The repeating unit B included in the specific copolymer is a repeating unit including two or more ring structures consisting of a cycloalkane ring or a monocyclic aromatic ring in which at least one of the ring structures consists of a monocyclic aromatic ring.

Next, the ring structure included in the repeating unit B, that is, the ring structure consisting of a cycloalkane ring or a monocyclic aromatic ring will be described.

First, the cycloalkane ring refers to a cyclic aliphatic saturated hydrocarbon ring, and specific examples thereof include a cyclohexane ring, a cycloheptane ring, a cyclooctane ring, a cyclononane ring, a cyclododecane ring, a cyclodocosane ring, and the like.

Among those, the cyclohexane ring is preferable, a 1,4-cyclohexylene group is more preferable, and a trans-1,4-cyclohexylene group is still more preferable.

On the other hand, the monocyclic aromatic ring refers to a monocyclic aromatic ring which is not fused or an individual monocyclic aromatic ring in a fused ring.

That is, the phenyl group is a group having one benzene ring which is a monocyclic aromatic ring, and the naphthyl group is a group having two benzene rings which are monocyclic aromatic rings.

Here, the number of atoms constituting the ring of the monocyclic aromatic ring is not particularly limited, but may be about 5 to 18, preferably 5 to 10, and more preferably 5 or 6.

The monocyclic aromatic ring may be an aromatic ring composed only of carbon, or may be a heteroaromatic ring containing an element other than carbon in the ring structure.

Examples of the aromatic ring include a benzene ring.

Examples of the heteroaromatic ring include an aromatic ring including one or two or more atoms selected from a sulfur atom, a nitrogen atom, and an oxygen atom.

As the heteroaromatic ring, a heteroaromatic ring including a sulfur atom is preferable, and a heteroaromatic ring including one sulfur atom is more preferable.

Specific examples of the heteroaromatic ring include a thiophene ring, a pyrrole ring, an imidazole ring, a pyrazole ring, a furan ring, an isothiazole ring, an isoxazole ring, a pyridine ring, a pyrazine ring, a pyrimidine ring, an isoxazole ring, a thiazole ring, an oxazole ring, an oxodiazole ring, a triazole ring, a thiadiazole ring, and the like.

The monocyclic aromatic ring is preferably a benzene ring, a thiophene ring, a pyridine ring, and an oxodiazole ring, and more preferably a benzene ring and an oxodiazole ring.

In the present invention, from the reason that the compatibility with the liquid crystal compound is improved and cissing during the formation of the liquid crystal cured layer is further suppressed, the repeating unit B is preferably a repeating unit represented by any one of Formulae (b1) to (b4).

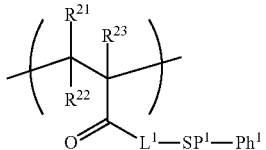

(b1)

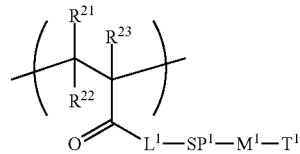

(b2)

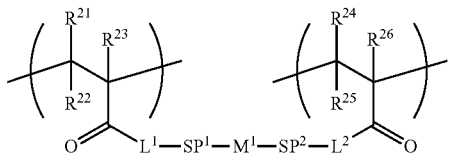

(b3)

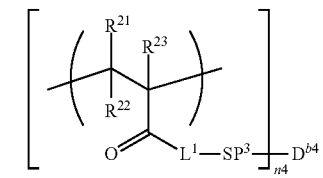

(b4)

In Formulae (b1) to (b4), $R^{21}$, $R^{22}$, and $R^{23}$, and $L^1$ are each the same as those described in Formula (Ib).

In addition, in Formula (b3), $R^{24}$ and $R^{25}$ each independently have the same definitions as $R^{21}$ and $R^{22}$ in Formula (Ib), and suitable aspects thereof are also the same.

$R^{26}$ has the same definition as $R^{23}$ in Formula (Ib), and the suitable aspect is also the same.

$L^2$ has the same definition as $L^1$ in Formula (Ib), and the suitable aspect is also the same.

In addition, $SP^1$ and $SP^2$ each independently represent a spacer group.

Furthermore, $SP^3$ represents a single bond or a divalent linking group.

In addition, $Ph^1$ represents a ring structure containing two or more monocyclic aromatic rings.

In addition, $M^1$ represents a mesogenic group.

In addition, $T^1$ represents a terminal group.

In addition, $D^{b4}$ represents a mesogenic group derived from a disk-like liquid crystal.

In addition, n4 represents an integer of 3 or more and 8 or less, and is equal to the valence of $D^{b4}$.

In Formulae (b1) to (b3), the spacer groups represented by $SP^1$ and $SP^2$ are not particularly limited as long as these are a divalent linking group having no ring structure, and specific examples thereof include a divalent aliphatic hydrocarbon group having 1 to 20 carbon atoms.

Here, as the divalent aliphatic hydrocarbon group having 1 to 20 carbon atoms, for example, an alkylene group having 1 to 15 carbon atoms is preferable, and an alkylene group having 1 to 8 carbon atoms is more preferable.

Specific preferable examples thereof include a methylene group, an ethylene group, a propylene group, a butylene group, a pentylene group, a hexylene group, a methylhexylene group, a heptylene group, and the like.

In addition, in the spacer group, one —$CH_2$— or two or more —$CH_2$-'s that are not adjacent to each other among —$CH_2$-'s constituting a part of a divalent hydrocarbon group may be each independently substituted with —O—, —S—, —NH—, or —N(Q)-.

The substituent represented by Q is preferably an alkyl group, more preferably a linear alkyl group having 1 to 4 carbon atoms, and still more preferably a methyl group or an ethyl group.

In the present invention, the spacer group is preferably a group represented by *—$(CH_2)_{n1}$—O—*.

Here, n1 represents an integer of 2 to 4, and * represents a bonding position with $L^1$ or $Ph^1(M^1)$.

In the formula (b4), the divalent linking group represented by $SP^3$ is not particularly limited as long as it is a divalent linking group, and examples of the divalent linking groups each independently include a divalent linking group selected from the group consisting of —O—, —S—, —C(=O)—, —$NR^7$—, —CH=CH—, —C≡C—, a divalent cyclic group, an alkylene group, and combinations thereof.

$R^7$ represents a hydrogen atom or a substituent (the substituent is preferably an alkyl group and more preferably a linear alkyl group having 1 to 4 carbon atoms).

Among these, $R^7$ is preferably a divalent linking group selected from the group consisting of —O—, —C(=O)—, a divalent cyclic group having 5 to 8 atoms, an alkylene group having 1 to 12 carbon atoms, or a combination thereof.

Examples of the divalent linking group include —O—CO-(a divalent cyclic group having 5 to 8 atoms)-, —O-(an alkylene group having 1 to 12 carbon atoms)-, -(a divalent cyclic group having 5 to 8 atoms)-(a divalent cyclic group having 5 to 8 atoms)-(an alkylene group having 1 to 12 carbon atoms)-CO—O-(an alkylene group having 1 to 12 carbon atoms)-, but the divalent linking group is not limited thereto.

In Formula (b1), examples of the ring structure including two or more monocyclic aromatic rings represented by $Ph^1$ include a naphthyl group and a biphenyl group, which may have a substituent. Among these, a naphthyl group is preferable.

The substituent is preferably an alkyl group, more preferably a linear alkyl group having 1 to 4 carbon atoms, and still more preferably a methyl group or an ethyl group.

In Formulae (b2) and (b3), the mesogen group represented by $M^1$ is a group showing a main skeleton of a liquid crystal molecule that contributes to liquid crystal formation.

A liquid crystal molecule exhibits liquid crystallinity which is in an intermediate state (mesophase) between a crystal state and an isotropic liquid state.

The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystal Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint of improving the alignment degree of the liquid crystal cured layer, the mesogen group is preferably a group having an aromatic hydrocarbon group or a group having an alicyclic group, which may have a substituent, more preferably a group having 2 to 4 aromatic hydrocarbon groups, and still more preferably a group having 3 aromatic hydrocarbon groups.

The substituent is preferably an alkyl group, an alkoxy group, an alkyl ester group, or an acetyl group, and more preferably a methyl group, a tert-butyl group, a methoxy group, or a methyl ester group.

In addition, from the reason cissing is further suppressed during the formation of the liquid crystal cured layer, $M^1$ in Formulae (b2) and (b3) preferably represents a mesogen group represented by Formula (M1-A).

In Formula (M1-A), * represents a bonding position to $SP^1$ or $T^1$.

In addition, n represents an integer of 1 or more, and is preferably an integer of 1 to 10. In addition, $Ph^{11}$ and $Ph^{12}$ each independently represent a divalent aromatic ring group which may have a substituent.

Provided that in a case where n represents an integer of 2 or more, a plurality of $Ph^{11}$'s may be the same as or different from each other.

In addition, $L^{11}$ represents a single bond or a divalent linking group.

Provided that in a case where n represents an integer of 2 or more, a plurality of $L^{11}$'s may be the same as or different from each other.

In a case where n is an integer of 2 or more and $Ph^{11}$ represents a phenylene group, from the viewpoint of improving alignment properties in a case where the liquid crystal compound is horizontally aligned, in any one of two or more $Ph^{11}$, a meta position linkage or an ortho position linkage is preferable, and among these, from the viewpoint of improving alignment properties and cissing, a meta position linkage is preferable.

On the other hand, in a case where the liquid crystal compound is vertically aligned, in any one of two or more $Ph^{11}$, a para position linkage is preferable.

Examples of the divalent aromatic ring group represented by $Ph^{11}$ and $Ph^{12}$ include a group in which two hydrogen atoms have been removed from an aromatic hydrocarbon ring, and a group in which two hydrogen atoms have been removed from an aromatic heterocycle.

Examples of aromatic hydrocarbon rings include a benzene ring, a naphthalene ring, an anthracene ring, a phenanthroline ring, and the like.

Examples of the aromatic heterocyclic ring include a furan ring, a pyrrole ring, a thiophene ring, a pyridine ring, a thiazole ring, a benzothiazole ring, and the like. Among these, a group in which two hydrogen atoms are removed from a benzene ring (for example, a 1,4-phenyl group) is preferable.

In addition, the substituent which may be contained in the divalent aromatic ring group is preferably an alkyl ester group, an alkyl group, or an acetyl group, more preferably a methyl ester group or a linear alkyl group having 1 to 4 carbon atoms, and still more preferably a methyl group or an ethyl group.

Examples of the divalent linking group represented by $L^{11}$ include —CO—, —O—, —S—, —C(=S)—, —CR$^1$R$^2$—, —CR$^3$=CR$^4$—, —NR$^5$—, or a combination of two or more of these groups.

$R^1$ to $R^5$ each independently represent a hydrogen atom, a fluorine atom, or an alkyl group having 1 to 12 carbon atoms.

In Formula (b2), the terminal group represented by $T^1$ represents a hydrogen atom or a group present on the terminal side of side chains from the mesogen group.

Here, examples of the group present on the terminal side of side chains from the mesogen group include a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a trialkylsilyloxy group having 3 to 12 carbon atoms, a ureido group having 1 to 10 carbon atoms, and the like.

Here, among —CH$_2$-'s constituting a part of the alkyl group, one —CH$_2$— or two or more —CH$_2$-'s that are not adjacent to each other each independently may be substituted with —O—, —S—, —NH—, or —N(Q)-.

The substituent represented by Q is preferably an alkyl group having 1 to 4 carbon atoms.

In Formula (b4), the mesogen group ($D^{b4}$) derived from the disk-like liquid crystal compound is preferably a structure represented by General Formula (I) or Formulae (D2) to (D13) which will be described later.

General Formula (I)

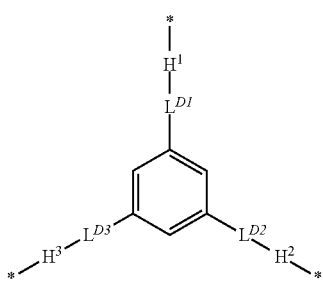

In General Formula (I), $L^{D1}$, $L^{D2}$, and $L^{D3}$ each independently represent a single bond or a divalent linking group, and $H^1$, $H^2$, and $H^3$ each independently represent General Formula (I-A).

General Formula (I-A)

In Formula (I-A), $YA^1$ and $YA^2$ each independently represent a methine group which may have a substituent, or a nitrogen atom, and XA represents an oxygen atom, a sulfur atom, a methylene group, or an imino group.

* represents a position bonded to the side of $L^{D1}$ to $L^{D3}$ in General Formula (I), and ** represents a position bonded to the side of * in General Formula (I).

Preferred examples of the substituent which may be contained in the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group.

$L^{D1}$, $L^{D2}$, and $L^{D3}$ each independently represent a single bond or a divalent linking group. In a case of being a divalent linking group, $L^{D1}$, $L^{D2}$, and $L^{D3}$ are each independently preferably a divalent linking group selected from the group consisting of —O—, —S—, —C(=O)—, —NR$^7$—, —CH=CH—, —C≡C—, a divalent cyclic group, and a combination thereof.

$R^7$ represents a hydrogen atom or a substituent (the substituent is preferably an alkyl group and more preferably a linear alkyl group having 1 to 4 carbon atoms).

The divalent cyclic group in $L^{D1}$, $L^{D2}$, and $L^{D3}$ is a divalent linking group having at least one kind of cyclic structure (hereinafter, may be referred to as a cyclic group).

The cyclic group is preferably a 5-membered ring, a 6-membered ring, or a 7-membered ring, more preferably the 5-membered ring or the 6-membered ring, and most preferably the 6-membered ring.

The ring included in the cyclic group may be a fused ring. Provided that the ring is more preferably a monocycle rather than the fused ring.

In addition, the ring in the cyclic group may be any one of an aromatic ring, an aliphatic ring, or a heterocyclic ring.

Preferred examples of the aromatic ring include a benzene ring and a naphthalene ring.

Preferred examples of the aliphatic ring include a cyclohexane ring.

As the heterocyclic ring, a ring including at least one of a sulfur atom, a nitrogen atom, or an oxygen atom is preferable, and preferred examples thereof include a pyridine ring, a pyrimidine ring, and an oxadiazole ring.

The cyclic group is more preferably an aromatic ring or a heterocyclic ring.

The divalent cyclic group in the present invention is more preferably a divalent linking group consisting of only a cyclic structure (provided that the group includes a substituent).

Among the divalent cyclic groups in $L^{D1}$, $L^{D2}$, and $L^{D3}$, the cyclic group having a benzene ring is preferably a 1,4-phenylene group.

As the cyclic group having a naphthalene ring, a naphthalene-1,5-diyl group and a naphthalene-2,6-diyl group are preferable.

As the cyclic group having a cyclohexane ring, a 1,4-cyclohexylene group is preferable.

As the cyclic group having a pyridine ring, a pyridine-2,5-diyl group is preferable.

As the cyclic group having a pyrimidine ring, a pyrimidine-2,5-diyl group is preferable.

As the cyclic group having an oxadiazole ring, a 1,2,4-oxadiazole-3,5-diyl group is preferable.

The divalent cyclic group in $L^{D1}$, $L^{D2}$, and $L^{D3}$ may have a substituent.

Examples of the substituent include a halogen atom (preferably a fluorine atom and a chlorine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms, and an acylamino group having 2 to 16 carbon atoms.

$L^{D1}$, $L^{D2}$, and $L^{D3}$ are preferably a single bond, *—O—C(=O)—, *—C(=O)—O—, *—CH=CH—, *—C≡C—, *-divalent cyclic group-, *—O—C(=O)-divalent cyclic group-, *—C(=O)—O-divalent cyclic group-, *—CH=CH-divalent cyclic group-, *—C≡C-divalent cyclic group-, *-divalent cyclic group-O—C(=O)—, *-divalent cyclic group-C(=O)—O—, *-divalent cyclic group-CH=CH—, or *-divalent cyclic group —C≡C—.

In particular, a single bond, *—CH=CH—, *—C≡C—, *—CH=CH-divalent cyclic group-, or *—C≡C-divalent cyclic group- is preferable, and a single bond is most preferable.

Here, * represents a position that is bonded to the 6-membered ring side in General Formula (I).

Specific examples of the compound represented by General Formula (I) include the exemplary compounds described in paragraphs [0068] to [0077] of JP2010-244038A and paragraphs [0040] to [0063] of JP2007-002220A.

Provided that the present invention is not limited to these compounds.

The compound can be synthesized by various methods, and for example, it can be synthesized by the methods described in [0064] to [0070] of JP2007-2220A.

Specific examples of the mesogen group ($D^{b4}$) derived from the disk-like liquid crystal compound are shown below.

Formula (D1) corresponds to a specific example of General Formula (I).

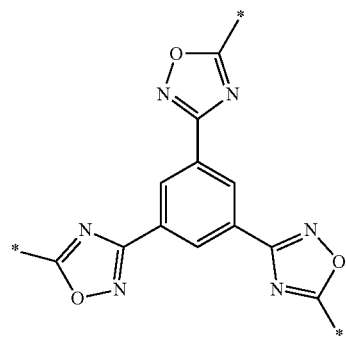

(D1)

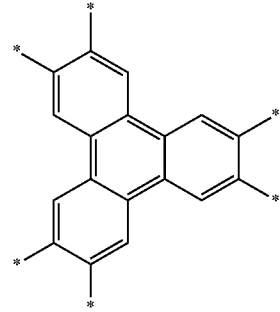

(D2)

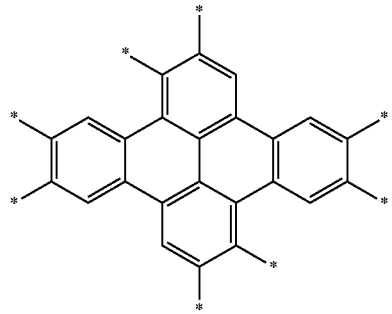

(D3)

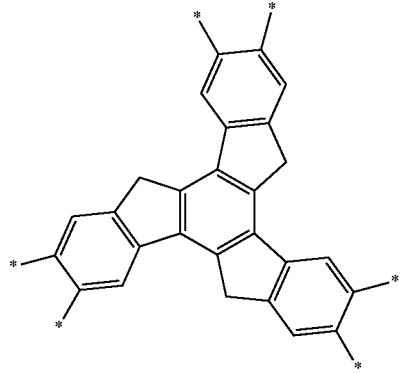

(D4)

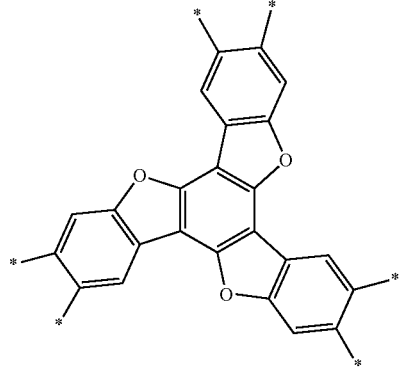

(D5)

(D6) 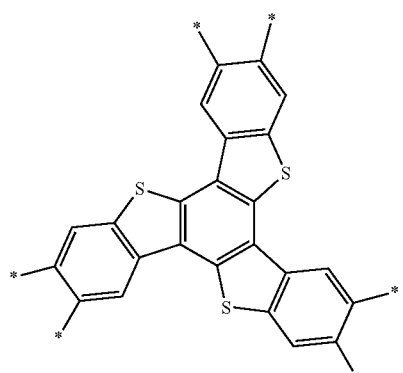
(D7) 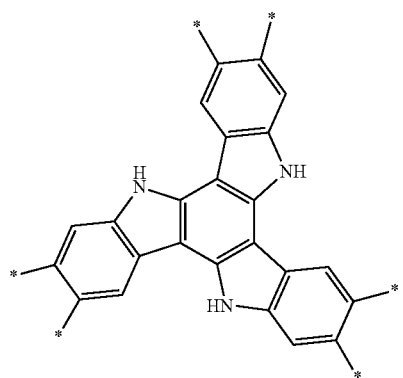
(D8) 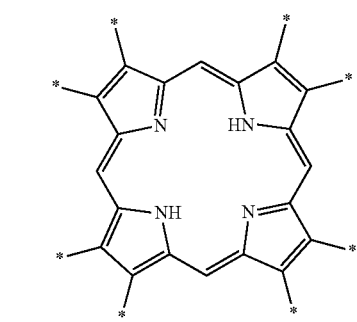
(D9) 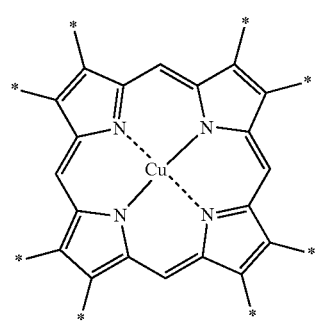
(D10) 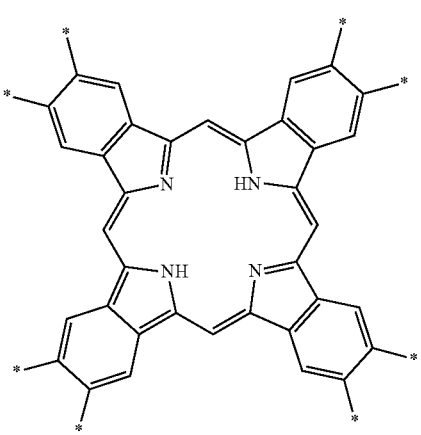
(D11) 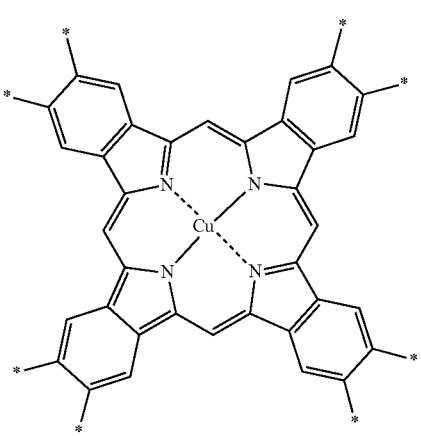
(D12) 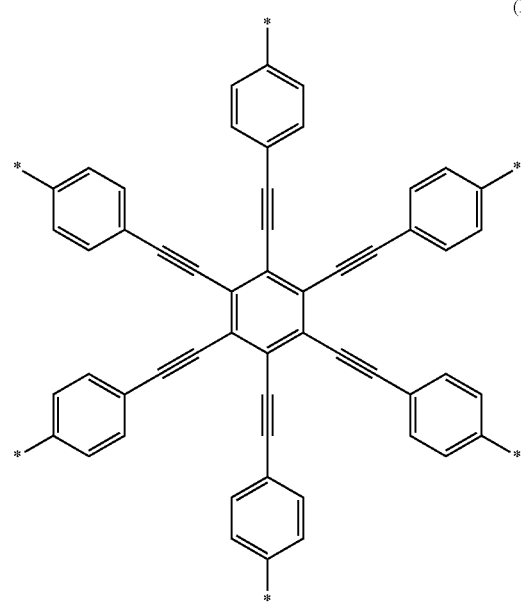

-continued (D13)

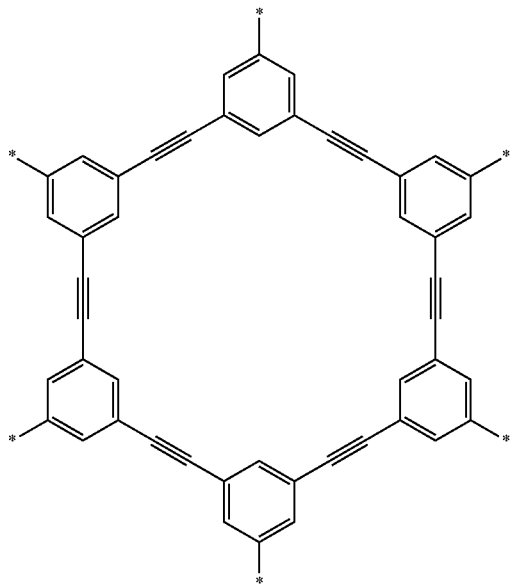

Specific examples of the repeating unit B include repeating units corresponding to the monomers represented by Formulae Q-1 to Q-34.

Here, the Formulae Q-1 and Q-2 are specific examples of the monomer forming the repeating unit represented by Formula (b1), Formulae Q-3 to Q-20, Q-26, and Q-28 to Q-32 are specific examples of the monomer forming the repeating unit represented by Formula (b2), Formulae Q-21 to Q-25, and Q-27 are specific examples of the monomer forming the repeating unit represented by Formula (b3), and Formulae Q-33 and Q-34 are specific examples of the monomer forming the repeating unit represented by Formula (b4).

In Examples which will be described later, the monomer represented by Formula Q-1 is referred to as a "Monomer Q-1".

The same applies to other monomers.

Q-1

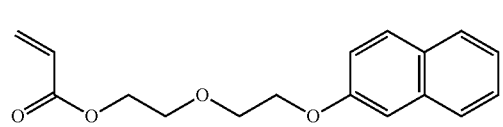

Q-2

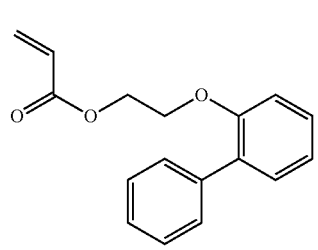

Q-3

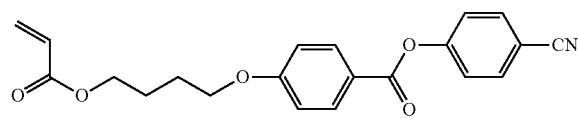

Q-4

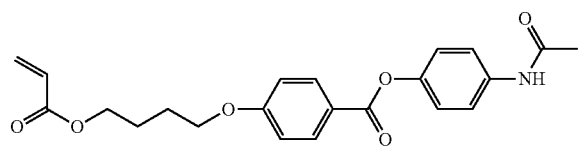

Q-5

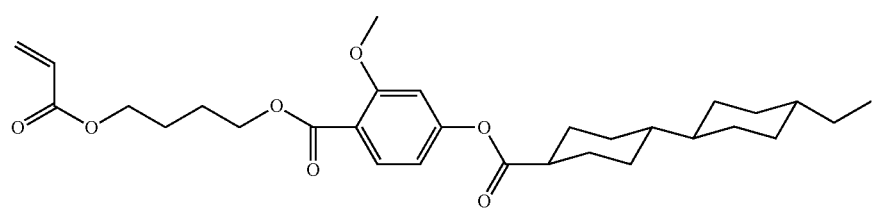

Q-6

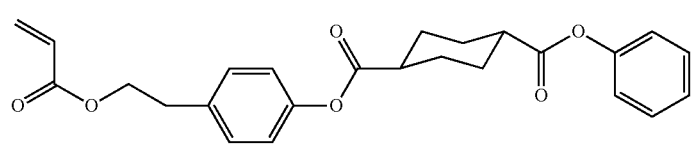

Q-7

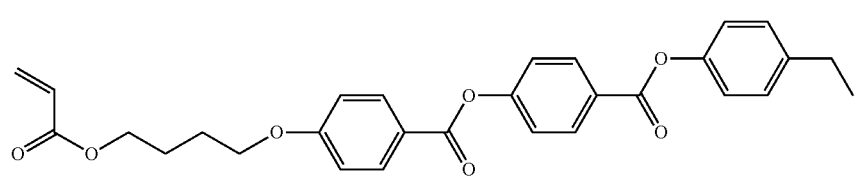

-continued
Q-8
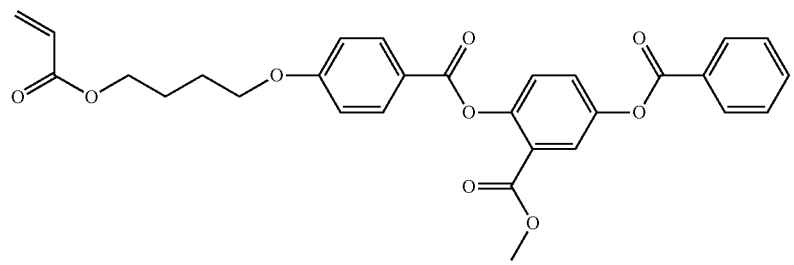
Q-9
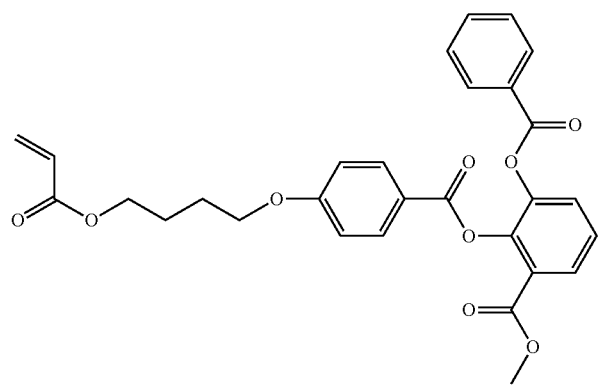
Q-10
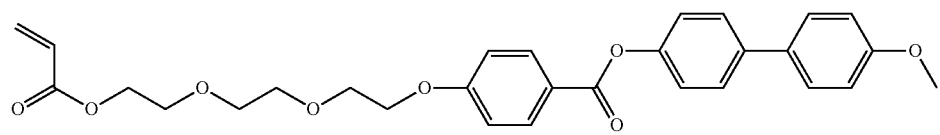
Q-11
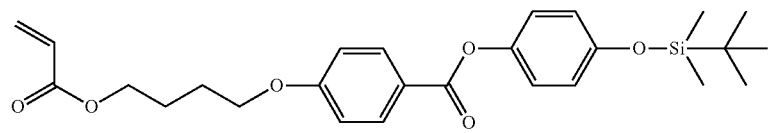
Q-12
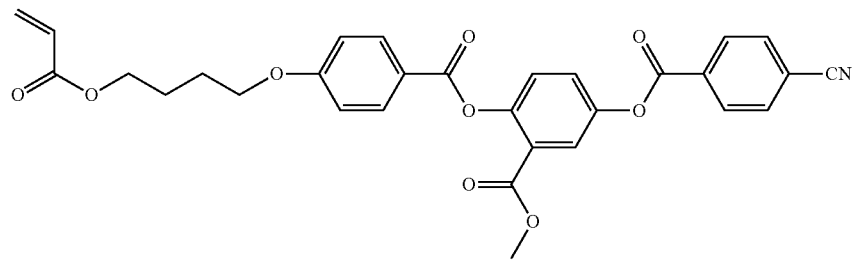
Q-13
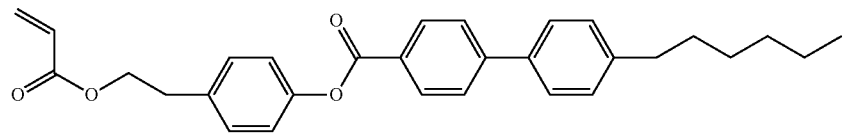
Q-14
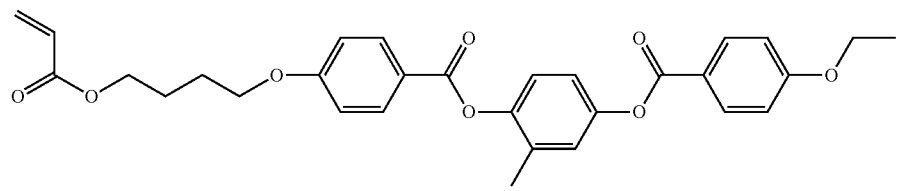

-continued
Q-15
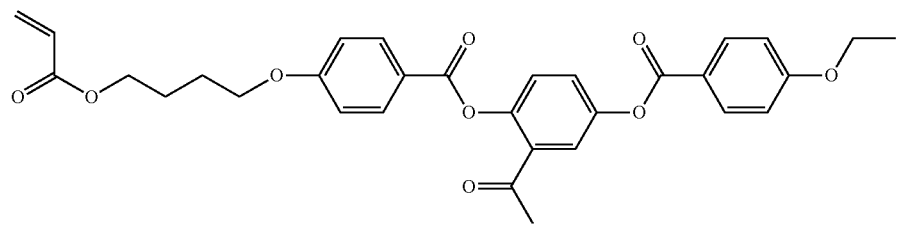
Q-16
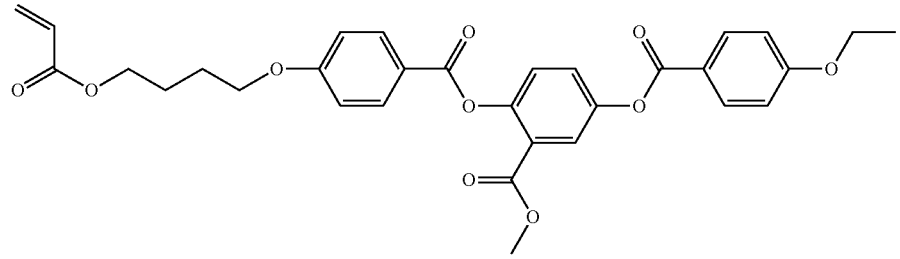
Q-17
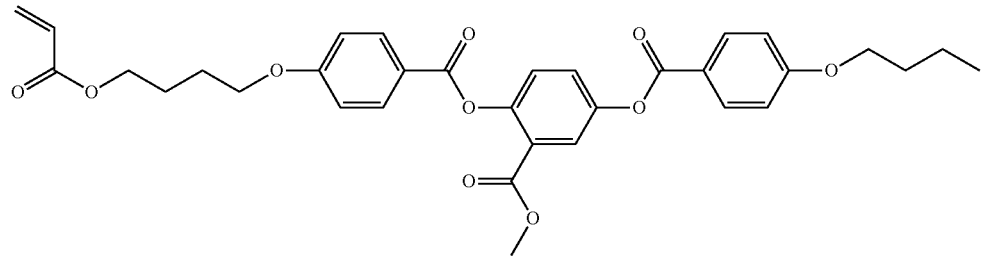
Q-18
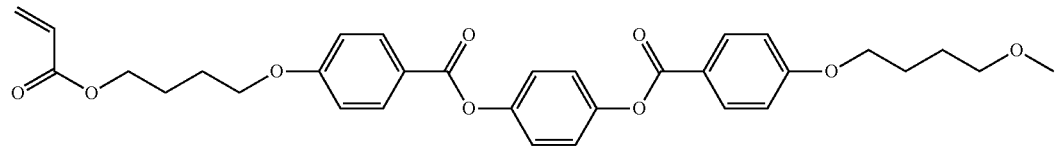
Q-19
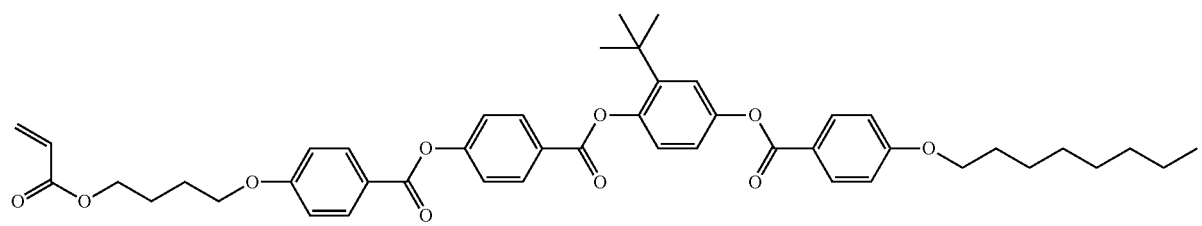
Q-20
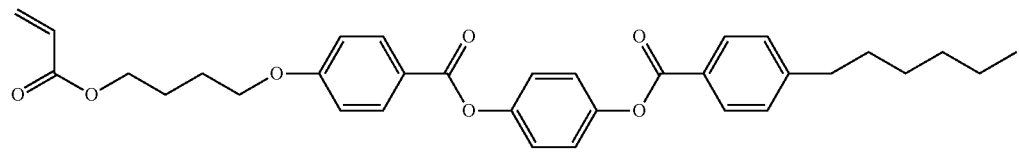
Q-21
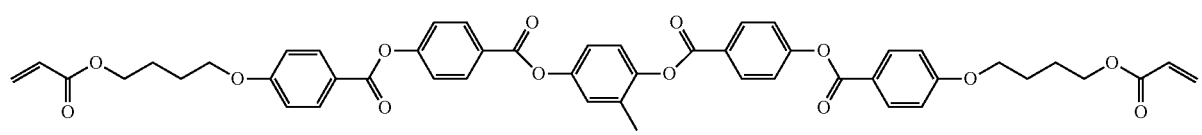

Q-22
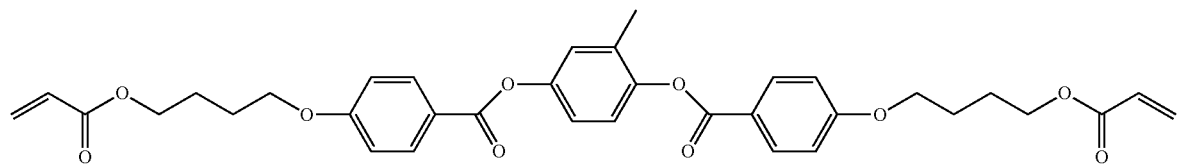
Q-23
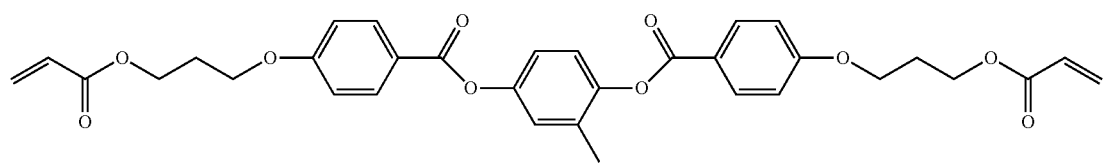
Q-24
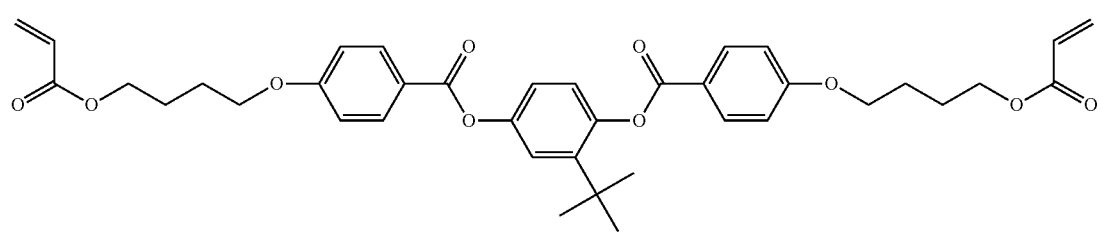
Q-25
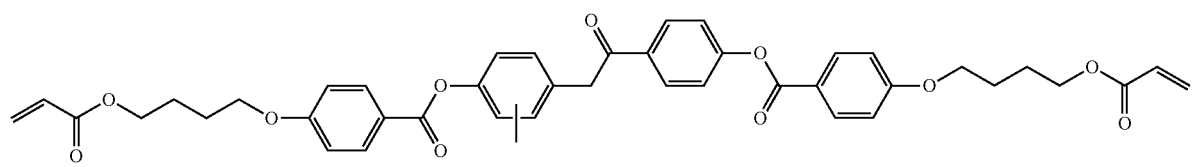
Q-26
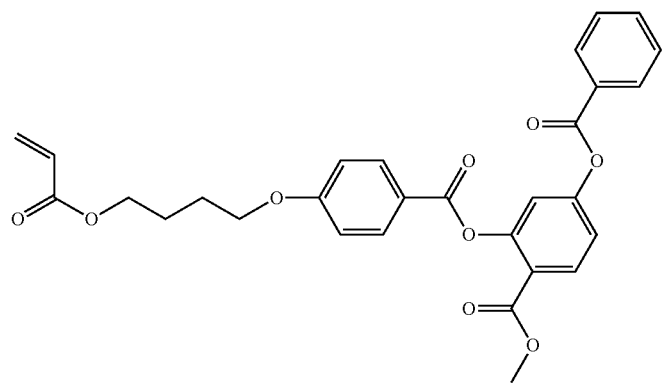
Q-27
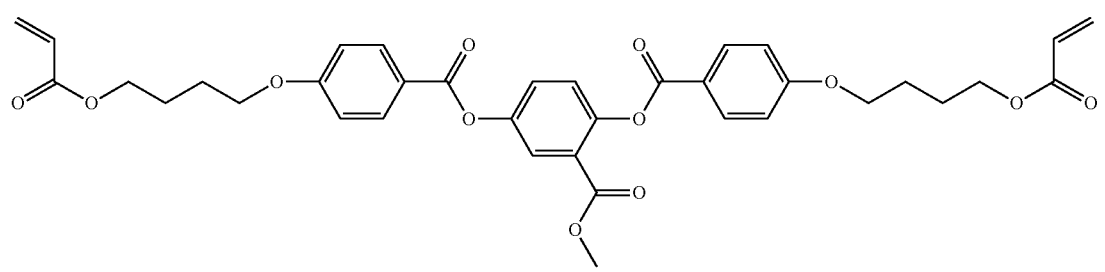

-continued
Q-28
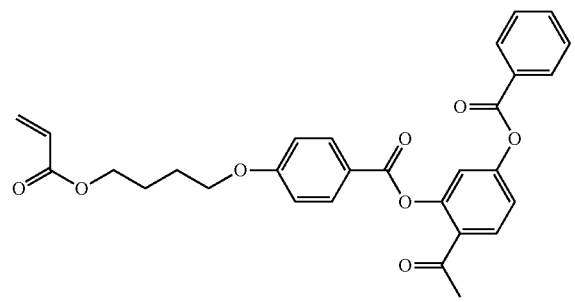
Q-29
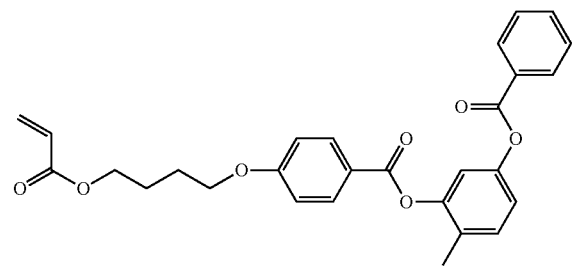
Q-30
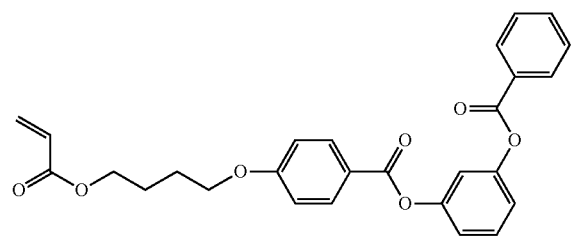
Q-31
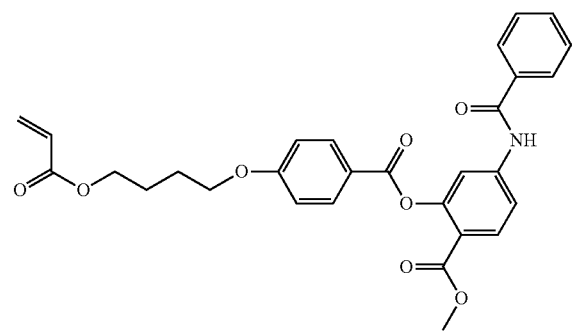
Q-32
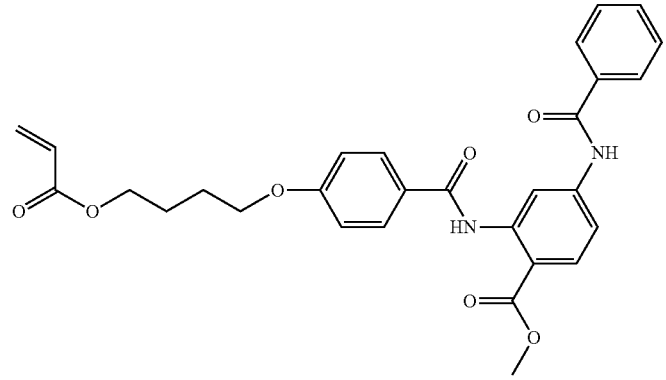
Q-33
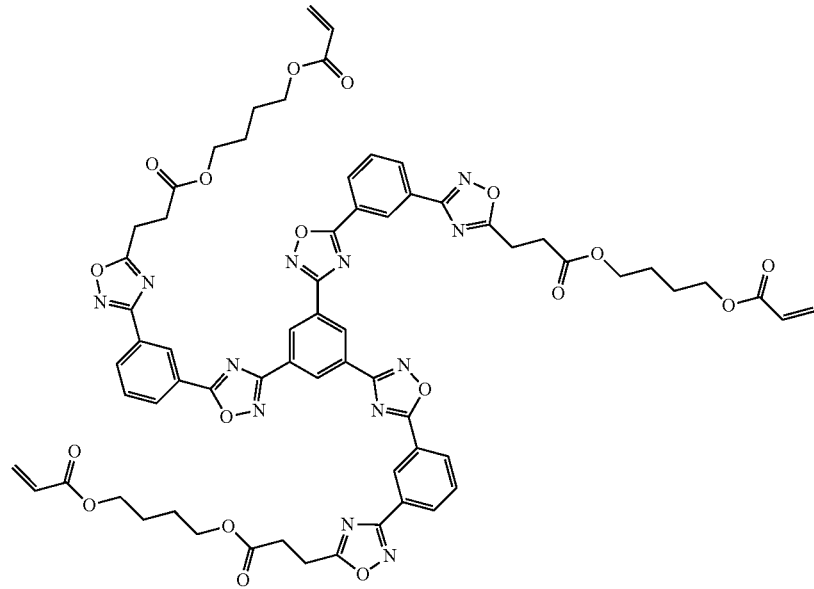

-continued

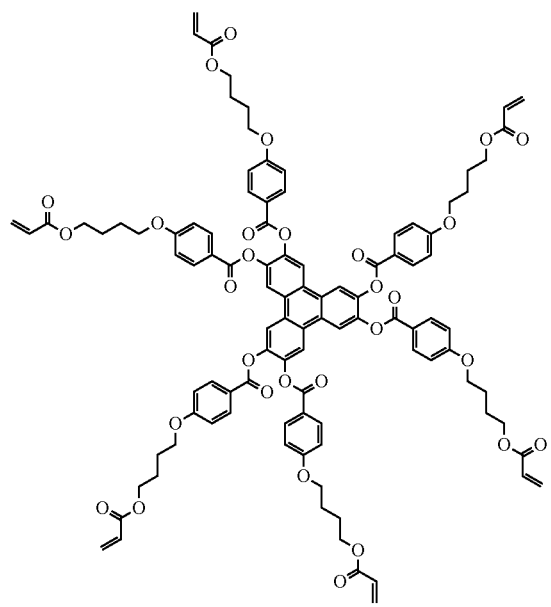

Q-34

In the present invention, as long as the effects of the present invention are not impaired, the specific copolymer may have a repeating unit C other than those described above.

Examples of the monomer forming a repeating unit C other than the foregoing repeating units include an acrylic acid, a methacrylic acid, an acrylic acid ester compound, a methacrylic acid ester compound, a maleimide compound, an acrylamide compound, a methacrylamide compound, acrylonitrile, maleic acid anhydride, a styrene compound, and a vinyl compound.

In the present invention, a content of the repeating unit A included in the specific copolymer is preferably 50% to 90% by mass with respect to the total mass of the repeating unit A and the repeating unit B.

In a case where the content of the repeating unit A is 50% by mass or more, unevenness is suppressed during the formation of the liquid crystal cured layer, and in a case where the content of the repeating unit A is 90% by mass or less, cissing is further suppressed during the formation of the liquid crystal cured layer, and the alignment properties of the liquid crystal cured layer is further improved.

The content of the repeating unit C included in the specific copolymer is preferably 0% to 25% by mass with respect to the total mass of the specific copolymer.

<Content>

From the viewpoint that the effects of the present invention are more excellent, the content of the specific surfactant is preferably in a range of 0.01% to 10% by mass, more preferably in a range of 0.02% to 1% by mass, and still more preferably in a range of 0.04% to 0.5% by mass with respect to the total solid content (100% by mass) of the liquid crystal composition.

<Molecular Weight>

The weight-average molecular weight (Mw) of the specific surfactant is preferably in a range of 10,000 to 40,000, more preferably in a range of 11,000 to 39,000, and still more preferably in a range of 13,000 to 35,000.

In a case where the weight-average molecular weight is 10,000 or more, unevenness is suppressed during the formation of the liquid crystal cured layer, and in a case where the weight-average molecular weight is 40,000 or less, the alignment properties of the liquid crystal cured layer are further improved.

Here, the weight-average molecular weight in the present invention is a value measured by gel permeation chromatography (GPC).

Solvent (eluent): tetrahydrofuran
Apparatus name: EcoSEC HLC-8320GPC (manufactured by TOSOH Corporation)
Column: three columns of TSKgel SuperHZM-H, TSKgel SuperHZ4000, and TSKgel SuperHZ200 (all manufactured by TOSOH Corporation) are connected and used.
Column Temperature: 40° C.
Sample concentration: 0.1% by mass
Flow rate: 0.35 ml/min
Calibration curve: TSK standard polystyrene (manufactured by TOSOH Corporation), calibration curves of six samples with Mw of 706,000 to 1,013 (Mw/Mn=1.03 to 1.06) are used.

[Solvent]

From the viewpoint of workability and the like, it is preferable that the liquid crystal composition according to the embodiment of the present invention contains a solvent.

Examples of the solvent include organic solvents such as ketones (such as acetone, 2-butanone, methyl ethyl ketone, methyl isobutyl ketone, cyclopentanone, and cyclohexanone), ethers (such as dioxane, tetrahydrofuran, tetrahydropyran, dioxolane, tetrahydrofurfuryl alcohol, and cyclopentyl methyl ether), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane (chloroform), dichloroethane, dichlorobenzene, and chlorotoluene), esters (such as methyl acetate, ethyl acetate, ethyl propionate, butyl acetate, and diethyl carbonate), alcohols (such as ethanol, isopropanol, butanol, and cyclohexanol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine), and water.

These solvents may be used alone or in combination of two or more kinds thereof.

Among these solvents, from the viewpoints of further improving the alignment properties of the liquid crystal cured layer to be formed and further improving the heat resistance, an organic solvent is preferably used and ketones and/or esters are more preferably used.

[Polymerization Initiator]

The liquid crystal composition according to the embodiment of the present invention may contain a polymerization initiator.

The polymerization initiator is not particularly limited, but a compound having photosensitivity, that is, a photopolymerization initiator is preferable.

As the photopolymerization initiator, various compounds can be used without any particular limitation.

Examples of the photopolymerization initiator include α-carbonyl compounds, acyloin ethers, α-hydrocarbon-substituted aromatic acyloin compounds, polynuclear quinone compounds, combinations of triarylimidazole dimers and p-aminophenyl ketone, acridine and phenazine compounds, oxadiazole compounds, o-acyloxime compound, and acylphosphine oxide compounds.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the liquid crystal composition contains a polymerization initiator, the content of the polymerization initiator is preferably in a range of 0.01% to 30% by mass and more preferably in a range of 0.1% to 15% by mass with respect to the total solid content (100% by mass) of the liquid crystal composition.

[Chiral Agent]

The liquid crystal composition may include a chiral agent.

The chiral agent may be selected according to the purpose since the induced helical twisted direction or helical pitch varies depending on the compound.

The chiral agent is not particularly limited, and a well-known compound (for example, Liquid Crystal Device Handbook (No. 142 Committee of Japan Society for the Promotion of Science, 1989), Chapter 3, Article 4-3, a chiral agent for twisted nematic (TN) or super twisted nematic (STN), p. 199), isosorbide, or an isomannide derivative can be used.

The chiral agent generally contains an asymmetric carbon atom, but an axially chiral compound or a planarly chiral compound containing no asymmetric carbon atom can also be used as the chiral agent.

Examples of the axially chiral compound or the planarly chiral compound include binaphthyl, helicene, paracyclophane, and derivatives thereof.

The chiral agent may also have a polymerizable group.

The polymerizable group of the chiral agent is preferably an unsaturated polymerizable group, an epoxy group, or an aziridinyl group, more preferably an unsaturated polymerizable group, and still more preferably an ethylenically unsaturated polymerizable group.

The chiral agent may also have a photoisomerization moiety.

The photoisomerization moiety is preferably a cinnamoyl moiety, a chalcone moiety, an azobenzene moiety, or a stilbene moiety, and more preferably a cinnamoyl moiety, a chalcone moiety, or a stilbene moiety.

Examples of a specific compound of the chiral agent include an optically active isosorbide derivative described in paragraphs 0015 to 0049 of JP2003-313187A, an optically active isomannide derivative described in paragraphs 0015 to 0057 of JP2003-313188A, an optically active polyester/amide described in paragraphs 0015 to 0052 of JP2003-313292A, and a chiral agent described in paragraphs 0012 to 0053 of WO2018/194157A.

In the viewpoint that the liquid crystal compound is easily aligned uniformly, the content of any chiral agent is preferably 5.0% by mass or less, more preferably 3.0% by mass or less, still more preferably 2.0% by mass or less, particularly preferably less than 1.0% by mass, with respect to the total mass of the liquid crystal compound.

The lower limit of the content of the chiral agent B is not particularly limited, and is preferably 0.01% by mass or more, more preferably 0.02% by mass or more, and still more preferably 0.05% by mass or more.

One kind of chiral agent may be used singly, or two or more kinds of chiral agents may be used in combination.

In a case where two or more kinds of the chiral agents are used in combination, a total content thereof is preferably within the range.

In a case where a liquid crystal cured layer having a plurality of alignment states in one layer is formed, as the chiral agent used in the liquid crystal composition, it is preferable to use two or more kinds of chiral agents including a chiral agent A and a chiral agent B that induces a helix in a direction opposite to that of the chiral agent A.

For example, in a case where the helix induced by the chiral agent A is right-handed, the helix induced by the chiral agent B is left-handed.

[Liquid Crystal Cured Layer]

The liquid crystal cured layer of an embodiment of the present invention is a liquid crystal cured layer obtained by immobilizing the alignment state of the above-mentioned liquid crystal composition of the embodiment of the present invention.

Examples of a method for forming the liquid crystal cured layer include a method in which the above-mentioned liquid crystal composition of the embodiment of the present invention is used to cause a desired alignment state, which is then immobilized by polymerization.

Here, the polymerization conditions are not particularly limited, but in the polymerization by irradiation with light, ultraviolet rays are preferably used.

The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$.

In addition, in order to promote the polymerization reaction, the reaction may be carried out under heating conditions.

The liquid crystal cured layer can be formed on any of supports or alignment films in the optical film which will be described later or a polarizer in the polarizing plate which will be described later.

The alignment state of the liquid crystal compound in the liquid crystal cured layer of the embodiment of the present invention may be any one of horizontal alignment, vertical alignment, tilt alignment, and twist alignment.

In addition, a plurality of alignment states may be provided in one layer as in a liquid crystal cured layer described in WO2021/033640A, having a first region in which an alignment state of a liquid crystal compound twist-aligned along a helical axis extending along a thickness direction is fixed and a second region in which an alignment state of a homogeneously aligned liquid crystal compound is fixed, along a thickness direction.

In addition, in the present specification, the "horizontal alignment" means that the main surface of a liquid crystal cured layer (or in a case where the liquid crystal cured layer is formed on a member such as a support and an alignment film, a surface of the member) and the major axis direction of the liquid crystal compound are parallel to each other.

Incidentally, it is not required for both the main surface of a liquid crystal cured layer and the major axis direction of the liquid crystal compound to be strictly parallel, and in the present specification, the expression means that both the main surface of a liquid crystal cured layer and the major axis direction of the liquid crystal compound are aligned at an angle formed by the major axis direction of the liquid crystal compound and the main surface of the liquid crystal cured layer of less than 10°.

The liquid crystal cured layer according to the embodiment of the present invention is preferably an optically anisotropic layer.

Examples of the optically anisotropic layer include a positive A-plate, a positive C-plate, and an optically anisotropic layer (hereinafter, this aspect is also referred to as an "optically anisotropic layer A") including a first region in which an alignment state of a liquid crystal compound twist-aligned along a helical axis extending along a thickness direction is fixed and a second region in which an alignment state of a homogeneously aligned liquid crystal compound is fixed, along the thickness direction.

Here, the positive A-plate (A-plate which is positive) and the positive C-plate (C-plate which is positive) are defined as follows.

In a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz, the positive A-plate satisfies the relationship of Expression (A1), and the positive C-plate satisfies the relationship of Expression (C1).

The positive A-plate has Rth of a positive value, and the positive C-plate has Rth of a negative value.

$$nx > ny \approx nz \qquad \text{Expression (A1)}$$

$$nz > nx \approx ny \qquad \text{Expression (C1)}$$

The symbol "≈" encompasses not only a case where the values of both sides are completely the same but also a case where the values of both sides are substantially the same. In the expression, "substantially the same", with regard to the positive A plate, for example, a case where (ny−nz)×d (in which d is the thickness of a film) is −10 to 10 nm, and preferably −5 to 5 nm is also included in "ny≈nz", and a case where (nx−nz)×d is −10 to 10 nm, and preferably −5 to 5 nm is also included in "nx≈nz".

In addition, with regard to the positive C plate, for example, a case where (nx−ny)×d (in which d is the thickness of a film) is 0 to 10 nm, and preferably 0 to 5 nm is also included in "nx≈ny".

In a case where the liquid crystal cured layer of the embodiment of the present invention is a positive A plate, the Re(550) is preferably 100 to 180 nm, more preferably 120 to 160 nm, still more preferably 130 to 150 nm, and particularly preferably 130 to 145 nm, from the viewpoint that the liquid crystal cured layer functions as a λ/4 plate.

Here, the "λ/4 plate" is a plate having a λ/4 function, and specifically, a plate having a function of converting linearly polarized light having a specific wavelength into circularly polarized light (or circularly polarized light into linearly polarized light).

An optically anisotropic layer (optically anisotropic layer A) having a first region in which an alignment state of a liquid crystal compound twist-aligned along a helical axis extending along a thickness direction is fixed and a second region in which an alignment state of a homogeneously aligned liquid crystal compound is fixed, along the thickness direction, will be described in detail.

In a case where the thickness of the first region of the optically anisotropic layer is defined as d1 (nm) and the refractive index anisotropy of the first region measured at a wavelength of 550 nm is defined as $\Delta n1$, from the viewpoint that an optically anisotropic layer can be suitably applied to a circularly polarizing plate, the first region preferably satisfies Expression (1-1).

$$100 \text{ nm} \leq \Delta n1 d1 \leq 240 \text{ nm} \qquad \text{Expression (1-1)}$$

Above all, the first region more preferably satisfies Expression (1-2) and still more preferably satisfies Expression (1-3).

$$120 \text{ nm} \leq \Delta n1 d1 \leq 220 \text{ nm} \qquad \text{Expression (1-2)}$$

$$140 \text{ nm} \leq \Delta n1 d1 \leq 200 \text{ nm} \qquad \text{Expression (1-3)}$$

The refractive index anisotropy $\Delta n1$ means a refractive index anisotropy of the first region.

The absolute value of the twisted angle of the liquid crystal compound in the first region is not particularly limited and is preferably 600 to 120° and more preferably 700 to 110° from the viewpoint that an optically anisotropic layer can be suitably applied to a circularly polarizing plate.

The twisted angle is measured using Axoscan of Axometrics, Inc. and using device analysis software of Axometrics, Inc.

In addition, in a case where the thickness of the second region of the optically anisotropic layer A is defined as d2 (nm) and the refractive index anisotropy of the second region measured at a wavelength of 550 nm is defined as $\Delta n2$, from the viewpoint that an optically anisotropic layer can be suitably applied to a circularly polarizing plate, the second region preferably satisfies Expression (2-1).

$$100 \text{ nm} \leq \Delta n2 d2 \leq 240 \text{ nm} \qquad \text{Expression (2-1)}$$

Above all, the second region more preferably satisfies Expression (2-2) and still more preferably satisfies Expression (2-3).

$$120 \text{ nm} \leq \Delta n2d2 \leq 220 \text{ nm} \qquad \text{Expression (2-2)}$$

$$140 \text{ nm} \leq \Delta n2d2 \leq 200 \text{ nm} \qquad \text{Expression (2-3)}$$

The refractive index anisotropy $\Delta n2$ means a refractive index anisotropy of the second region.

[Optical Film]

The optical film of an embodiment of the present invention is an optical film having the liquid crystal cured layer of the embodiment of the present invention.

The structure of the optical film will be described with reference to FIG. 1.

FIG. 1 is a schematic cross-sectional view showing an example of the optical film.

Furthermore, FIG. 1 is a schematic view, and the thicknesses relationship, the positional relationship, and the like among the respective layers are not necessarily consistent with actual ones, and either of the support shown in FIG. 1 and an alignment film are optional constitutional members.

An optical film 10 shown in FIG. 1 has a support 16, an alignment film 14, and a liquid crystal cured layer 12 as the cured product of the liquid crystal composition of the embodiment of the present invention in this order.

In addition, the liquid crystal cured layer 12 may be a laminate of two or more different liquid crystal cured layers.

For example, in a case where the polarizing plate of the embodiment of the present invention which will be described later is used as a circularly polarizing plate or in a case where the optical film of the embodiment of the present invention is used as an optical compensation film for an in-plane-switching (IPS) mode or a fringe-field-switching (FFS) mode liquid crystal display device, the liquid crystal cured layer is preferably a laminate of a positive A plate and a positive C plate.

In addition, the liquid crystal cured layer may be peeled from the support, and the liquid crystal cured layer may be used alone as an optical film.

Hereinafter, various members used for the optical film will be described in detail.

[Liquid Crystal Cured Layer]

The liquid crystal cured layer contained in the optical film of the embodiment of the present invention is the above-mentioned liquid crystal cured layer of the embodiment of the present invention.

In the optical film, a thickness of the liquid crystal cured layer is not particularly limited, but is preferably 0.1 to 10 µm, and more preferably 0.5 to 5 km.

[Support]

The optical film may have a support as a base material for forming a liquid crystal cured layer as described above.

Such a support is preferably transparent.

Specifically, the light transmittance is preferably 80% or more.

Examples of such a support include a glass substrate and a polymer film.

Examples of the material for the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an aspect in which a polarizer which will be described later also functions as such a support is also available.

A thickness of the support is not particularly limited, but is preferably 5 to 100 µm, and more preferably 5 to 50 µm.

The support is preferably peelable.

[Alignment Film]

In the optical film, the liquid crystal cured layer is preferably formed on a surface of an alignment film.

In a case where the optical film has any of the above-mentioned supports, it is preferable that the alignment film may be sandwiched between the support and the liquid crystal cured layer.

In addition, an aspect in which the above-mentioned support may also function as an alignment film is also available.

The alignment film may be any film as long as it has a function of aligning the polymerizable liquid crystal compound included in the composition.

Generally, the alignment film contains a polymer as a main component.

Polymer materials for the alignment film are described in many documents, and many commercially available products thereof can be used.

As the polymer material for the alignment film, a polyvinyl alcohol, a polyimide, or a derivative thereof is preferable, and a modified or unmodified polyvinyl alcohol is more preferable.

Since an object does not come into contact with a surface of the alignment film upon formation of the alignment film and the deterioration of a surface condition can be prevented, it is also preferable to use a photo-alignment film as the alignment film.

The photo-alignment film is not particularly limited, but an alignment film formed by the polymer material such as a polyamide compound and a polyimide compound described in paragraphs [0024] to [0043] of WO2005/096041A; a liquid crystal alignment film formed by the liquid crystal alignment agent having a cinnamoyl group described in JP2012-155308A; LPP-JP265CP, trade name, manufactured by Rolic Technologies Ltd.; or the like can be used.

A thickness of the alignment film is not particularly limited, but from the viewpoint of forming a liquid crystal cured layer having a uniform film thickness by relaxing the surface roughness that can be present on the support, the thickness is preferably 0.01 to 10 µm, more preferably 0.01 to 1 µm, and still more preferably 0.01 to 0.5 µm.

[Other Liquid Crystal Cured Layer]

In the optical film, the liquid crystal cured layer according to the embodiment of the present invention may be formed on a surface of another liquid crystal cured layer, or another liquid crystal cured layer may be formed on a surface of the liquid crystal cured layer according to the embodiment of the present invention.

Here, examples of the other liquid crystal cured layer include a liquid crystal cured layer obtained by fixing the above-described liquid crystal composition according to the embodiment of the present invention in a desired alignment state.

In addition, examples thereof include a liquid crystal cured layer (light absorption anisotropic film) obtained by fixing an alignment state of a composition containing the above-mentioned liquid crystal compound, polymerization initiator, dichroic substance, surfactant, solvent, and the like.

[Ultraviolet Absorber]

The optical film may include an ultraviolet (UV) absorbing agent, taking an effect of external light (particularly ultraviolet rays) into consideration.

The ultraviolet absorbing agent may be included in the liquid crystal cured layer or may also be included in a member other than the liquid crystal cured layer, constituting the optical film.

Suitable examples of the member other than the liquid crystal cured layer include a support.

As the ultraviolet absorber, any of ultraviolet absorbers known in the related art capable of exhibiting ultraviolet absorbing properties can be used.

Among such the ultraviolet absorbing agents, a benzotriazole-based or hydroxyphenyltriazine-based ultraviolet absorbing agent is preferable from the viewpoint that it has high ultraviolet absorptivity and ultraviolet absorbing ability (ultraviolet-shielding ability) used for an image display device is obtained.

In addition, in order to broaden ultraviolet absorbing ranges, two or more kinds of ultraviolet absorbing agents having different maximum absorption wavelengths are also preferably used.

As an ultraviolet absorber, for example, Tinuvin 400, Tinuvin 405, Tinuvin 460, Tinuvin 477, Tinuvin 479, and Tinuvin 1577 (all manufactured by BASF) can be used.

[Polarizing Plate]

A polarizing plate according to the embodiment of the present invention has the above-mentioned optical film according to the embodiment of the present invention and a polarizer.

In a case where the liquid crystal cured layer (optically anisotropic layer) of the optical film is a positive A-plate, from the viewpoint that the optical film can be suitably applied to a circularly polarizing plate or the like, an angle formed by the slow axis of the positive A-plate and the absorption axis of a polarizer which will be described later is preferably 30° to 60°, more preferably 40° to 50°, still more preferably 42° to 48°, and particularly preferably 45°.

Here, the "slow axis" means a direction in which the in-plane refractive index of the liquid crystal cured layer is maximized, and the "absorption axis" of the polarizer means a direction in which the absorbance is the highest.

In a case where the liquid crystal cured layer (optically anisotropic layer) of the optical film is the above-mentioned optically anisotropic layer A, from the viewpoint that the optically anisotropic layer A can be suitably applied to a circularly polarizing plate or the like, the absolute value of the angle formed by the in-plane slow axis of the second region in which an alignment state of a homogeneously aligned liquid crystal compound is fixed and the absorption axis of the polarizer is preferably 5° to 25° and more preferably 100 to 20°.

In addition, the polarizing plate can also be used as an optical compensation film for an IPS mode or FFS mode liquid crystal display device.

In a case where the polarizing plate is used as an optical compensation film for an IPS mode or FFS mode liquid crystal display device, it is preferable that the above-mentioned optically anisotropic layer is used as at least one plate of a laminate of a positive A plate or a positive C plate, an angle formed by the slow axis of the positive A plate layer and the absorption axis of a polarizer which will be described later are orthogonal or parallel, and specifically, it is more preferable that an angle formed by the slow axis of the positive A plate layer and the absorption axis of the polarizer which will be described later is 0° to 5° or 85° to 95°.

In a case where the polarizing plate according to the embodiment of the present invention is used in an image display device which will be described later, it is preferable that an angle formed by the slow axis of the liquid crystal cured layer and the absorption axis of a polarizer which will be described later is parallel or orthogonal to each other.

In addition, in the present specification, a term "parallel" does not require that both the angle formed by the slow axis of the liquid crystal cured layer and the absorption axis of a polarizer are strictly parallel, but means that an angle between one and the other is less than 10°. In addition, in the present specification, a term "orthogonal" does not require that both the angle formed by the slow axis of the liquid crystal cured layer and the absorption axis of a polarizer are strictly orthogonal, but means that the angle between one and the other is more than 800 and less than 100°.

[Polarizer]

The polarizer is not particularly limited as long as it is a member having a function of converting light into specific linearly polarized light. An absorption-type polarizer, a reflective-type polarizer, or a coating-type polarizer which has been known can be used. An iodine-based polarizer, a dye-based polarizer using a dichroic dye, a polyene-based polarizer, or the like is used as the absorptive type polarizer.

The iodine-based polarizer and the dye-based polarizer are classified into a coating type polarizer and a stretching type polarizer. Any of these polarizers can be applied, but a polarizer produced by adsorbing iodine or a dichroic dye to polyvinyl alcohol and performing stretching is preferable.

Examples of the coating-type polarizer include a polarizer including a cured product of a liquid crystal compound and a dichroic colorant.

As the reflective-type polarizer, a polarizer in which thin films having different birefringences are laminated, a wire grid type polarizer, a polarizer in which a cholesteric liquid crystal having a selective reflection range and a ¼ wavelength plate are combined, or the like is used.

A thickness of the polarizer is not particularly limited, but is preferably 3 to 60 µm, more preferably 3 to 30 µm, and still more preferably 3 to 10 µm.

[Pressure-Sensitive Adhesive Layer]

In the polarizing plate, a pressure sensitive adhesive layer may be arranged between the liquid crystal cured layer in the optical film and the polarizer.

Examples of a material forming the pressure sensitive adhesive layer used for lamination of the cured product and the polarizer include a member formed of a substance in which a ratio (tan δ=G"/G') between a storage elastic modulus G' and a loss elastic modulus G", each measured with a dynamic viscoelastometer, is 0.001 to 1.5, in which a so-called pressure sensitive adhesive and a readily creepable substance are included.

Examples of the pressure sensitive adhesive include a polyvinyl alcohol-based pressure sensitive adhesive, but the pressure sensitive adhesive is not limited thereto.

[Adhesive Layer]

In the polarizing plate, an adhesive layer may be arranged between the liquid crystal cured layer in the optical film and the polarizer.

As the adhesive layer used for laminating a cured product and a polarizer, a curable adhesive composition that is cured by irradiation with active energy rays or heating is preferable. Examples of the curable adhesive composition include a curable adhesive composition containing a cationically polymerizable compound and a curable adhesive composition containing a radically polymerizable compound.

A thickness of the adhesive layer is preferably 0.01 to 20 µm, more preferably 0.01 to 10 µm, and still more preferably 0.05 to 5 µm.

In a case where the thickness of the adhesive layer is within this range, floating or peeling does not occur between the protective layer or liquid crystal cured layer and the polarizer, which are laminated, and a practically acceptable adhesive force can be obtained.

In addition, the thickness of the adhesive layer is preferably 0.4 µm or more from the viewpoint that the generation of air bubbles can be suppressed.

With regard to the adhesive layer, reference can be made to the description in paragraphs [0062] to [0080] of JP2016-35579A, the contents of which are incorporated herein by reference.

[Easy Adhesion Layer]

In the polarizing plate, an easy adhesion layer may be arranged between the liquid crystal cured layer in the optical film and the polarizer.

A storage elastic modulus of the easy adhesion layer at 85° C. is preferably $1.0 \times 10^6$ Pa to $1.0 \times 10^7$ Pa from the viewpoints that the adhesiveness between the liquid crystal cured layer and the polarizer is excellent and the generation of cracks in the polarizer is suppressed.

Examples of the constituent material of the easy adhesion layer include a polyolefin-based component and a polyvinyl alcohol-based component.

A thickness of the easy adhesion layer is preferably 500 nm to 1 µm.

With regard to the easy adhesion layer, reference can be made to the description in paragraphs [0048] to [0053] of JP2018-36345A, the contents of which are incorporated herein by reference.

[Image Display Device]

An image display device according to the embodiment of the present invention is an image display device including the optical film according to the embodiment of the present invention or the polarizing plate according to the embodiment of the present invention.

A display element used in the image display device is not particularly limited, and examples thereof include a liquid crystal cell, an organic electroluminescent (hereinafter simply referred to as "electro luminescence (EL)") display panel, and a plasma display panel.

Among these, a liquid crystal cell and an organic EL display panel are preferable.

[Liquid Crystal Display Device]

A liquid crystal display device which is an example of the image display device is a liquid crystal display device having the above-mentioned polarizing plate and a liquid crystal cell.

Furthermore, it is preferable that the above-mentioned polarizing plate is used as the polarizing plate of the front side, and it is more preferable that the above-mentioned polarizing plate is used as the polarizing plates on the front and rear sides, among the polarizing plates provided on both the front and rear sides of the liquid crystal cell.

<Liquid Crystal Cell>

The liquid crystal cell used for the liquid crystal display device is preferably in a vertical alignment (VA) mode, an optically compensated bend (OCB) mode, an in-plane-switching (IPS) mode, a fringe-field-switching (FFS) mode, or a twisted nematic (TN) mode, but is not limited thereto.

[Organic EL Display Device]

Examples of the organic EL display device which is an example of the image display device include an aspect which includes, from the visible side, a polarizer, a λ/4 plate consisting of the above-mentioned liquid crystal cured layer, and an organic EL display panel in this order.

In addition, the organic EL display panel is a display panel constituted with an organic EL element in which an organic light emitting layer (organic electroluminescent layer) is sandwiched between electrodes (between a cathode and an anode).

The configuration of the organic EL display panel is not particularly limited, and a known configuration is adopted.

EXAMPLES

Hereinafter, the present invention will be described in more detail based on Examples.

The materials, amounts used, proportions, treatment details, treatment procedures, and the like shown in the following examples can be appropriately changed as long as not departing from the gist of the present invention.

Accordingly, the scope of the present invention should not be construed as being limited to Examples shown below.

Synthesis Example 1

12.0 g of cyclohexanone was placed in a 200 mL three-necked flask equipped with a stirrer, a cooling tube, a nitrogen introduction tube, and a thermometer, and heated to 80° C. Subsequently, a mixed solution of 24.0 g of a monomer K-1 (Silaplane TM-0701T manufactured by JNC Corporation), 16.0 g of a monomer Q-1, 0.5 g of dimethyl 2,2'-azobis(isobutyrate), and 28.0 g of cyclohexanone was added dropwise thereto over 2 hours.

After aging for 1 hour, a mixed solution of 1.0 g of dimethyl 2,2'-azobis(isobutyrate) and 8.0 g of cyclohexanone was added thereto, and the internal temperature was adjusted to 105° C. for further aging for 3 hours.

Then, the mixture was cooled and diluted by addition of 45.0 g of cyclohexanone to obtain Copolymer (No101).

The obtained copolymer has a weight-average molecular weight of 29,500 and a molecular weight distribution of 2.70.

Synthesis Examples 2 to 20

Copolymers (No102) to (No112) and (No114) to (No119), and Copolymers (C-1) and (C-2) were obtained in the same manner as in Synthesis Example 1, except that the monomers and the compositional ratios used in Synthesis Example 1 were changed to the monomers forming the repeating unit of the copolymers having the structures shown in Table 1, and compositional ratios thereof.

The weight-average molecular weights of Copolymers (No106) to (No109) were adjusted to be in the range described in the table by adjusting the addition amount of the initiator with respect to Copolymer (No101).

Example 1

[Preparation of Cellulose Acylate Film (Substrate)]

The following composition was put into a mixing tank, stirred, and further heated at 90° C. for 10 minutes.

Thereafter, the obtained composition was filtered through filter paper having an average pore size of 34 μm and a sintered metal filter having an average pore size of 10 μm, thereby preparing a dope.

The concentration of solid contents of the dope is 23.5% by mass, the amount of the plasticizer added is a proportion relative to cellulose acylate, and the solvent of the dope is methylene chloride/methanol/butanol=81/18/1 (in terms of a mass ratio).

| Cellulose acylate dope | |
|---|---|
| Cellulose acylate (acetyl substitution degree: 2.86, viscosity average polymerization degree: 310) | 100 parts by weight |
| Sugar ester compound 1 (represented by Chemical Formula (S4)) | 6.0 parts by weight |
| Sugar ester compound 2 (represented by Chemical Formula (S5)) | 2.0 parts by weight |
| Silica particles dispersion (AEROSIL R972, manufactured by Nippon Aerosil Co., Ltd) | 0.1 parts by mass |
| Solvent (methylene chloride/methanol/butanol) | |

(S4)

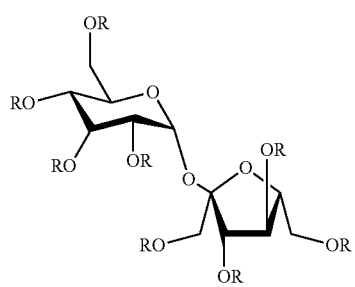

(R = benzoyl or H
Average substitution degree 5.7)

(S5)

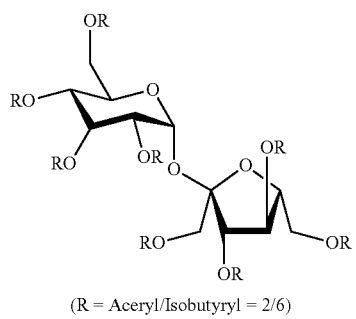

(R = Aceryl/Isobutyryl = 2/6)

The prepared above was cast using a drum film-forming machine.

The dope was cast from a die such that the dope was in contact with a metal support cooled to 0° C., and then the obtained web (film) was stripped off.

The drum was made of Steel Use Stainless (SUS).

The web (film) obtained by casting was peeled off from the drum and dried in a tenter device for 20 minutes using a tenter device such that both ends of the web were clipped with clips and transported at 30° C. to 40° C. during film transport.

Subsequently, the web was post-dried by zone heating while being transported using a roll.

The obtained web was subjected to knurling and wound up.

The film thickness of the obtained cellulose acylate film was 40 μm, the in-plane retardation Re (550) at a wavelength of 550 nm was 1 nm, and the retardation Rth (550) at a wavelength of 550 nm in the thickness direction was 26 nm.

<Alkali Saponification Treatment>

After passing the above-mentioned cellulose acylate film through a dielectric heating roll at a temperature of 60° C. to raise the film surface temperature to 40° C., an alkaline solution having the composition shown below was applied onto a band surface of the film using a bar coater at a coating amount of 14 ml/m², followed by heating to 110° C., and transportation under a steam type far-infrared heater manufactured by Noritake Co., Limited for 10 seconds.

Subsequently, the film was coated with 3 ml/m² of pure water similarly using a bar coater.

Next, the process of washing the film with water using a fountain coater and draining the film using an air knife was repeated three times, and the film was transported to a drying zone at 70° C. for 10 seconds and dried, thereby preparing a cellulose acylate film which had been subjected to an alkali saponification treatment.

| Alkaline solution | |
|---|---|
| Potassium hydroxide | 4.7 parts by weight |
| Water | 15.8 parts by weight |
| Isopropanol | 63.7 parts by weight |
| Surfactant SF-1: $C_{14}H_{29}O(CH_2CH_2O)_{20}H$ | 1.0 part by weight |
| Propylene glycol | 14.8 parts by weight |

<Formation of Alignment Film>

An alignment film coating liquid having the following composition was continuously applied onto the surface of the cellulose acylate film that had been subjected to the alkali saponification treatment with a #14 wire bar.

The surface was dried with hot air at 60° C. for 60 seconds and further dried with hot air at 100° C. for 120 seconds.

The degree of saponification of the used modified polyvinyl alcohol was 96.8%.

| Alignment film coating liquid | |
|---|---|
| The following modified polyvinyl alcohol-1 | 10 parts by weight |
| Water | 170 parts by weight |
| Methanol | 57 parts by weight |

Modified polyvinyl alcohol-1 (in the formulae, the numerical value described in each repeating unit represents a content (mol %) of each repeating unit with respect to all repeating units)

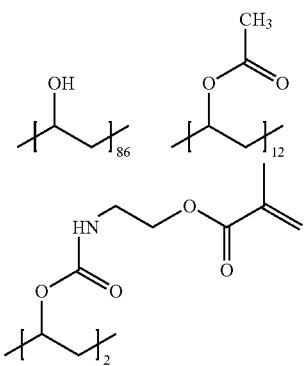

[Formation of Liquid Crystal Cured Layer]

The cellulose acylate film prepared above was continuously subjected to a rubbing treatment.

At this time, the longitudinal direction of the long film was parallel to the transport direction, and the angle between the film longitudinal direction (transport direction) and the rotation axis of the rubbing roller was set to 77.0°.

In a case where the film longitudinal direction (transport direction) is 90° and the counterclockwise direction is represented by a positive value with reference to a film width direction as a reference (0°) in a case of being observed from the film side, the rotation axis of the rubbing roller is at 13.0°.

That is, the position of the rotation axis of the rubbing roller is a position rotated by 77.0° clockwise with respect to the film longitudinal direction as a reference.

Using the rubbing-treated cellulose acylate film as a substrate, the liquid crystal composition (1) containing a rod-like liquid crystal compound having the following composition was applied using a geeser coating machine to form a composition layer.

The absolute value of the weighted average helical twisting power of the chiral agent in the composition layer in the step 1 was 0.0 $\mu m^{-1}$.

Next, the obtained composition layer was heated at 80° C. for 60 seconds.

This heating resulted in the alignment of the rod-like liquid crystal compound of the composition layer in a predetermined direction.

Thereafter, the composition layer was irradiated with ultraviolet rays (irradiation amount: 70 mJ/cm$^2$) using an LED lamp (manufactured by Acroedge Corporation) at 365 nm under a temperature condition of 30° C. in the air containing oxygen (oxygen concentration: approximately 20% by volume).

Subsequently, the obtained composition layer was heated at 80° C. for 10 seconds.

This was followed by nitrogen purging, and then the composition layer was irradiated (irradiation amount: 500 mJ/cm$^2$) with ultraviolet rays using a metal halide lamp (manufactured by Eye Graphics Co., Ltd.) at 75° C. with an oxygen concentration of 100 ppm by volume to form a liquid crystal cured layer (optically anisotropic layer) in which the alignment state of the liquid crystal compound was fixed.

An optical film was prepared in this manner.

| Liquid crystal composition (1) | |
|---|---|
| The following rod-like liquid crystal compound (A) | 80 parts by mass |
| The following precipitation inhibiting compound (A) | 17 parts by mass |
| The following precipitation inhibiting compound (B) | 3 parts by mass |
| Ethylene oxide-modified trimethylolpropane triacrylate (V#360, manufactured by OSAKA ORGANIC CHEMICAL INDUSTRY LTD.) | 3 parts by weight |
| Photopolymerization initiator (Ominirad. 819, manufactured by IGM Resins B.V.) | 4 parts by weight |
| Left-twisted chiral agent (L1) | 3 parts by weight |
| Right-twisted chiral agent (R1) | 0.48 parts by weight |
| Copolymer (No101) | 0.43 parts by weight |
| Methyl isobutyl ketone | 0.08 parts by weight |
| Ethyl propionate | 72 parts by weight |
|  | 72 parts by weight |

Rod-like liquid crystal compound (A) [mixture of the following liquid crystal compounds (RA), (RB), and (RC) at 84:14:2 (mass ratio)]

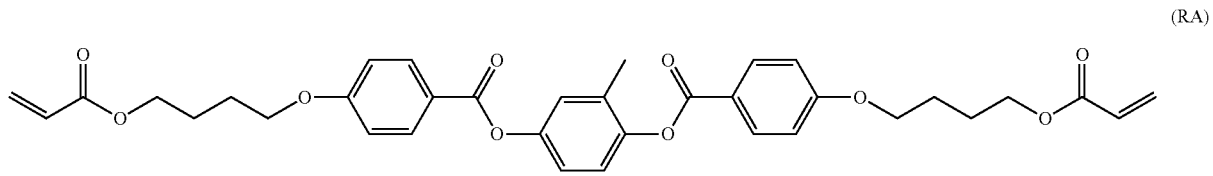

(RA)

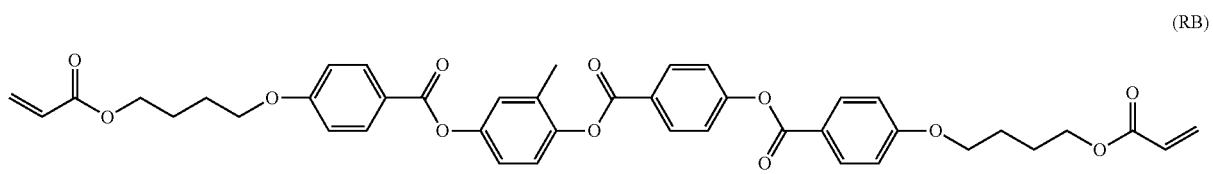

(RB)

(RC)

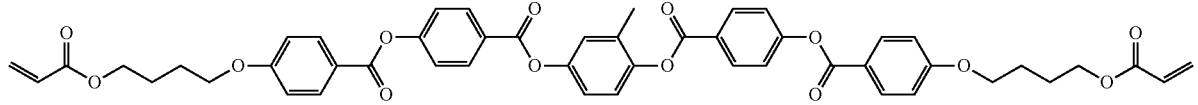

Precipitation inhibiting compound (A): Me represents a methyl group

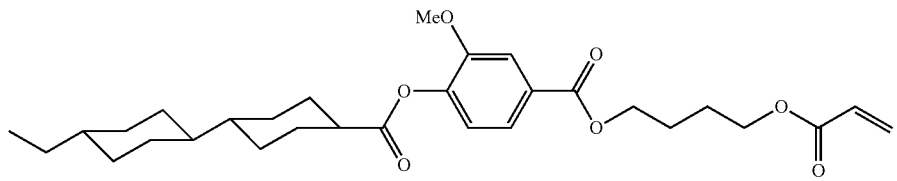 [SMILES: C=CC(=O)OCCCCOC(=O)c1ccc(OC(=O)C2CCC(C3CCC(CC)CC3)CC2)c(OC)c1]

Precipitation inhibiting compound (B)

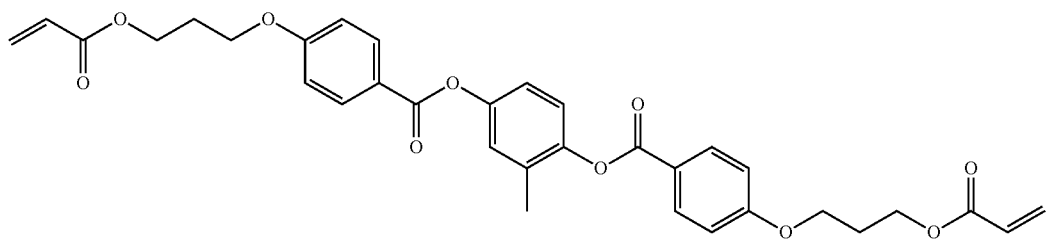 [SMILES: C=CC(=O)OCCCOc1ccc(C(=O)Oc2ccc(OC(=O)c3ccc(OCCCOC(=O)C=C)cc3)c(C)c2)cc1]

Left-twisted chiral agent (L1): Bu represents a butyl group

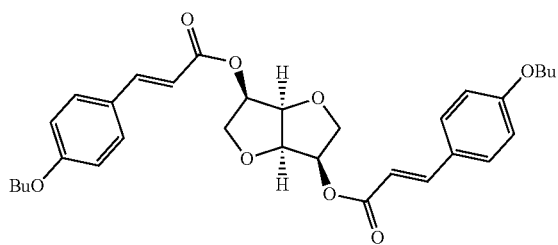

Right-twisted chiral agent (R1)

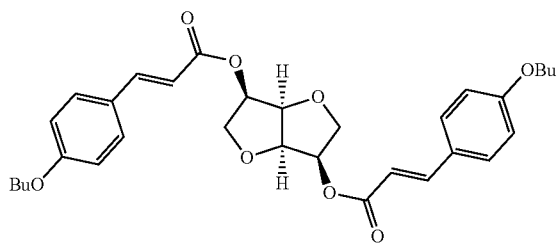

The optical film prepared above was cut in parallel with the rubbing direction, and the liquid crystal cured layer was observed in a cross-sectional direction with a polarizing microscope.

The thickness of the liquid crystal cured layer was 2.6 μm, a region (second region) where the thickness (d2) of the liquid crystal cured layer on the side of the substrate was 1.3 μm was formed in a homogeneous alignment without a twisted angle, and a region (first region) where the thickness (d1) of the liquid crystal cured layer on the air side (on a side opposite to the substrate) was 1.3 μm was formed such that the liquid crystal compound was twistedly aligned.

In addition, the optical characteristics of the optical film were acquired using Axoscan (Axometrics, Inc.) and analysis software (Multi-Layer Analysis) (Axometrics, Inc.).

The product (Δn2d2) of Δn2 and the thickness d2 (nm) at a wavelength of 550 nm in the second region was 178 nm, the twisted angle of the liquid crystal compound was 0°, and the alignment axis angle of the liquid crystal compound with respect to the long longitudinal direction on the side in contact with the substrate was −11.0° and the alignment axis angle thereof on the side in contact with the first region was −11.0°.

In addition, the product (Δn1d1) of Δn1 and the thickness d1 (nm) at a wavelength of 550 nm in the first region was 180 nm, the twisted angle of the liquid crystal compound was 88°, and the alignment axis angle of the liquid crystal compound with respect to the long longitudinal direction on the side in contact with the second region was −11.0° the alignment axis angle thereof on the air side was −91.0°.

The alignment axial angle of the liquid crystal compound contained in the liquid crystal cured layer is expressed as negative in a case where it is clockwise (right-handed turning) and positive in a case where it is counterclockwise (left-handed turning) with the longitudinal direction of the substrate as a reference of 0°, upon observing the substrate from the surface side of the liquid crystal cured layer.

In addition, the twisted structure of the liquid crystal compound here is expressed as negative in a case where the alignment axis direction of the liquid crystal compound on the substrate side (back side) is clockwise (right-handed turning) and positive in a case where it is counterclockwise (left-handed turning) with reference to the alignment axis direction of the liquid crystal compound on the surface side (front side), upon observing the substrate from the surface side of the liquid crystal cured layer.

[Preparation of Polarizer]

A polyvinyl alcohol (PVA) film having a thickness of 80 µm was dyed by immersing it in an iodine aqueous solution having an iodine concentration of 0.05% by mass at 30° C. for 60 seconds.

Next, the obtained film was machine-direction stretched 5 times its original length while immersed in a boric acid aqueous solution having a boric acid concentration of 4% by mass for 60 seconds, and then dried at 50° C. for 4 minutes to obtain a polarizer having a thickness of 20 µm.

[Preparation of Polarizer Protective Film]

A commercially available cellulose acylate-based film FUJITAC TG40UL (manufactured by FUJIFILM Corporation) was prepared and immersed in a sodium hydroxide aqueous solution at 1.5 mol/liter at 55° C., and then the sodium hydroxide was thoroughly washed away with water.

Thereafter, the obtained film was immersed in a 0.005 mol/liter dilute sulfuric acid aqueous solution at 35° C. for 1 minute and immersed in water, and the dilute sulfuric acid aqueous solution was sufficiently washed off.

Finally, the obtained film was sufficiently dried at 120° C. to prepare a polarizer protective film which had been subjected to a saponification treatment on a surface.

[Preparation of Circularly Polarizing Plate]

The optical film prepared above was subjected to a saponification treatment in the same manner as in the preparation of the polarizer protective film described above, and then the polarizer and the polarizer protective film described above were continuously bonded to the substrate surface included in the optical film using a polyvinyl alcohol-based adhesive to prepare a long circularly polarizing plate.

That is, the circularly polarizing plate had the polarizer protective film, the polarizer, the substrate, and the liquid crystal cured layer in this order.

The absorption axis of the polarizer was coincided with the longitudinal direction of the circularly polarizing plate, the rotation angle of the in-plane slow axis in the second region with respect to the absorption axis of the polarizer was 11.0°, and the rotation angle of the in-plane slow axis on the surface on a side of the first region opposite to the side of the second region with respect to the absorption axis of the polarizer was 91.0°.

The rotation angle of the in-plane slow axis is represented by a positive angle value in a counterclockwise direction and a negative angle value in a clockwise direction, with the longitudinal direction of the substrate as a reference of 0°, upon observation of the liquid crystal cured layer from the side of the polarizer.

Examples 2 to 12 and Comparative Examples 1 and 2

Liquid crystal compositions (2) to (12) and (C1) to (C2) were obtained in the same manner as in Example 1, except that the copolymer (No101) of Example 1 was changed to copolymers (No102) to (No112) and (C-1) to (C-2) shown in Table 1.

In addition, using these liquid crystal compositions, a liquid crystal cured layer, an optical film, and a circularly polarizing plate were obtained in the same manner as in Example 1.

Example 13

A liquid crystal cured layer, an optical film, and a circularly polarizing plate were obtained by the following procedure.

(Preparation of Liquid Crystal Cured Layer and Optical Film)

A cellulose triacetate film TJ40 (manufactured by Fujifilm Corporation, thickness: 40 µm) was prepared as a support.

Next, the same composition for forming a photo-alignment film as in Example 1 of WO2020/175620A was prepared and applied onto the support with a #3.0 wire bar. Thereafter, drying with hot air at 60° C. for 60 seconds was performed to manufacture a coating film having a thickness of 300 nm.

The prepared coating film was irradiated with ultraviolet rays using an ultra-high pressure mercury lamp in the atmosphere.

In this case, a wire grid polarizer (ProFlux PPL02, manufactured by Moxtek, Inc.) was set so as to be parallel to a surface of the coating film, exposed, and subjected to a photo-alignment treatment to obtain a photo-alignment film.

At that time, the illuminance of the ultraviolet rays was 10 mJ/cm$^2$ in a UV-A range (A-wave of ultraviolet rays, integration of wavelengths of 320 to 380 nm).

Next, the following liquid crystal composition (13) was applied onto the photo-alignment film using a bar coater.

The obtained coating film was heat-aged at a film surface temperature of 100° C. for 20 seconds and cooled to 90° C., and then a nematic alignment state was fixed by irradiation with 300 mJ/cm$^2$ of ultraviolet rays in the air using an air-cooled metal halide lamp (manufactured by EYE GRAPHICS Co., Ltd.) to form a positive A-plate 1 (corresponding to a liquid crystal cured layer).

| Liquid crystal composition (13) | |
|---|---|
| The above-described precipitation inhibiting compound (A) | 16 parts by weight |
| The following liquid crystal compound L-1 | 42 parts by weight |
| The following liquid crystal compound L-2 | 42 parts by weight |
| The polymerization initiator S-1 | 0.5 parts by weight |
| Copolymer (No101) | 0.2 parts by weight |
| Methyl ethyl ketone | 230 parts by weight |
| Cyclopentanone | 70 parts by weight |

Liquid Crystal Compound L-1, tBu Represents a Tert-Butyl Group

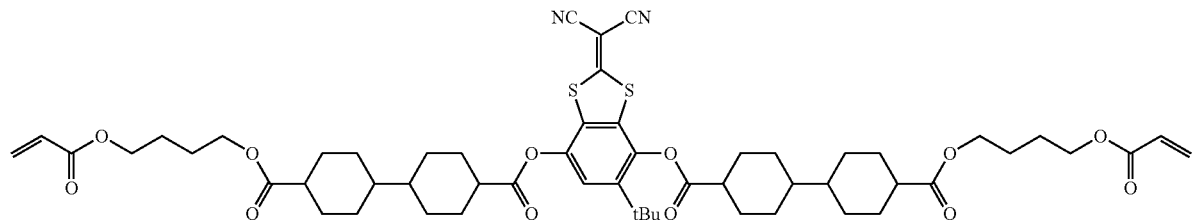 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Liquid Crystal Compound L-2

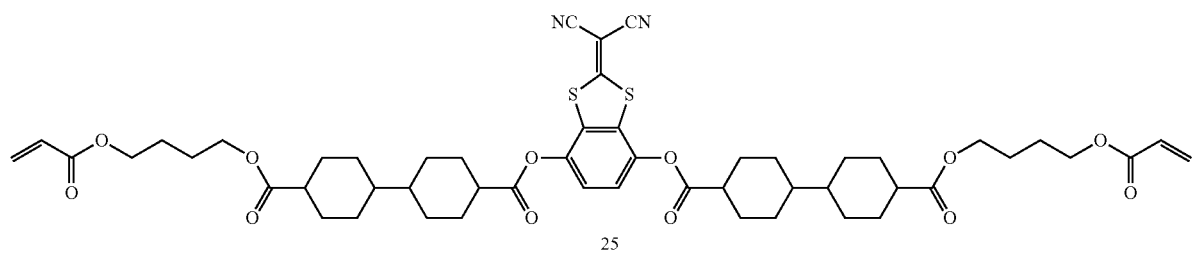

Polymerization Initiator S-1

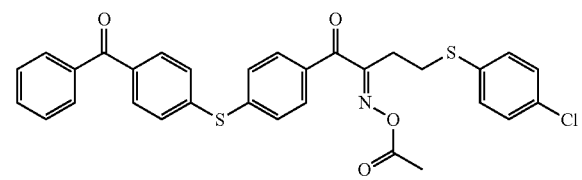 [SMILES: CC(=O)O/N=C(\CCSc1ccc(Cl)cc1)C(=O)c1ccc(Sc2ccc(C(=O)c3ccccc3)cc2)cc1]

The formed positive A-plate 1 had a film thickness of 2.5 m.

In the positive A-plate 1, Re(550) was 145 nm, Rth(550) was 73 nm, Re(550)/Re(450) was 1.13, Re(650)/Re(550) was 1.01, a tilt angle of an optical axis was 0°, and the liquid crystal compound was in homogeneous alignment.

In this manner, an optical film was manufactured.
(Preparation of Circularly Polarizing Plate)

The above-mentioned polarizer and polarizer protective film were bonded to each other to obtain a polarizing plate in which the polarizer was exposed on one side.

Next, the exposed surface of the polarizer and a surface of the positive A-plate 1 were bonded to each other using a pressure sensitive adhesive (SK-2057, manufactured by Soken Chemical Co., Ltd.) such that the angle formed by the absorption axis of the polarizer and the slow axis of the positive A-plate 1 is 45°, to obtain a laminate.

Next, the support and the photo-alignment film were peeled off from the obtained laminate to obtain a circularly polarizing plate.

Examples 14 to 17

Liquid crystal compositions (14) to (17) were obtained in the same manner as in Example 1, except that the copolymer (No101) of Example 1 was changed to copolymers (No114) to (No117) shown in Table 1.

In addition, using these liquid crystal compositions, a liquid crystal cured layer, an optical film, and a circularly polarizing plate were obtained in the same manner as in Example 1.

Example 18

An optical film and a circularly polarizing plate were obtained in the same manner as in Example 1, except that the liquid crystal composition (1) of Example 1 was changed to the following coating liquid R1 for a cholesteric liquid crystal layer, and the following cholesteric liquid crystal layer R1 was used as a liquid crystal cured layer.

[Formation of Liquid Crystal Cured Layer]

A coating liquid R1 for a cholesteric liquid crystal layer having the following composition was prepared.

| The coating liquid R1 for a cholesteric liquid crystal layer | |
|---|---|
| Disk-like liquid crystal compound (Compound 101) | 80 parts by mass |
| Disk-like liquid crystal compound (Compound 102) | 20 parts by mass |
| The following polymerizable monomer 1 | 10 parts by weight |
| Copolymer (No118) | 0.3 parts by weight |
| The following polymerization initiator 1 | 3 parts by weight |
| The following chiral agent 1 | 3.03 parts by weight |
| The following vertical alignment agent 1 | 0.2 parts by weight |
| Methyl ethyl ketone | 290 parts by mass |
| Cyclohexanone | 50 parts by weight |

Compound 101

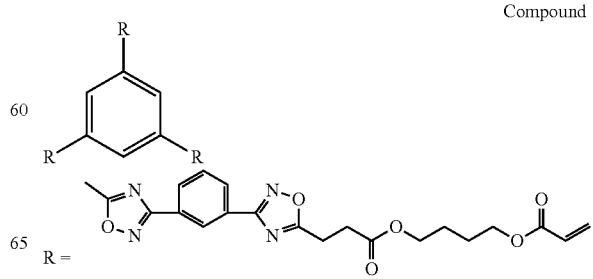

-continued

Compound 102

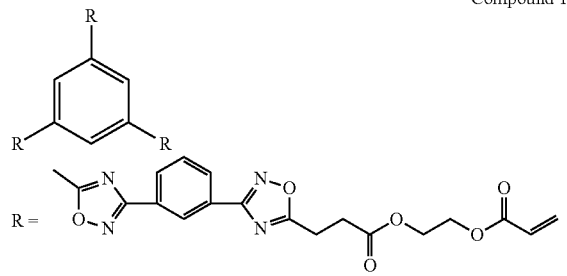

Chiral Agent 1

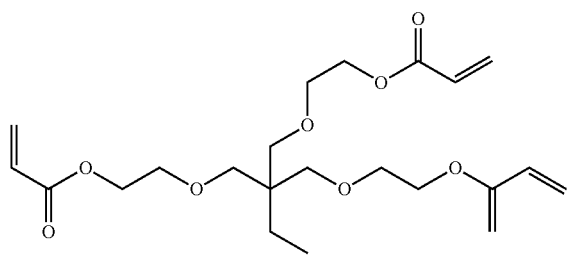

Polymerizable monomer

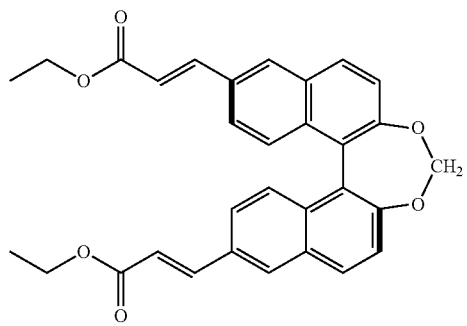

Vertical Alignment Agent 1

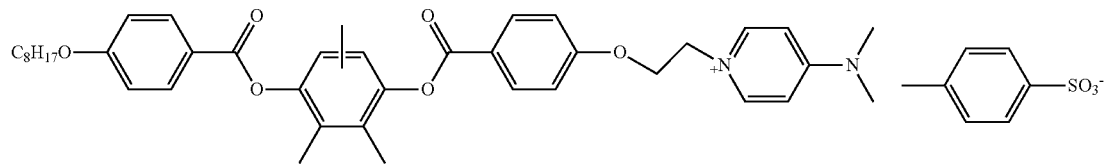

The prepared coating solution R1 for a cholesteric liquid crystal layer was applied to a cellulose acylate film subjected to a rubbing treatment, which is prepared in the same manner as in Example 1, using a bar coater.

Subsequently, the coating film was dried at 70° C. for 2 minutes and heat-aged at 115° C. for 3 minutes after the solvent was vaporized, thereby obtaining a uniform alignment state.

Thereafter, the coating film was retained at 45° C. and was subjected to ultraviolet irradiation (300 mJ/cm$^2$) under a nitrogen atmosphere by using a high pressure mercury lamp to form a cholesteric liquid crystal layer R1 reflecting right circularly polarized red light.

As a result of observing a cross section of the cholesteric liquid crystal layer R1 with a scanning electron microscope (SEM), the film thickness was 2.8 μm.

In addition, it was confirmed that the cholesteric liquid crystal layer R1 was formed in a vertical alignment.

Examples 19 and 20

A cholesteric liquid crystal layer R2 was formed in the same manner as in Example 18, except that Copolymer (No118) was changed to Copolymers (No119) and (No120) shown in Table 1.

Next, an optical film and a circularly polarizing plate were obtained in the same manner as in Example 1, except that the cholesteric liquid crystal layer R2 was used as the liquid crystal cured layer.

[Evaluation of Cissing]

Five 18×30 cm films were randomly cut out from each of the prepared optical films, the number of cissing of the liquid crystal cured layer was counted, and the average value of the number of cissing of the five films was calculated.

The cissing refers to a region where the liquid crystal cured layer is not formed.

Cissing refers to a portion that remains dark even in a case where a sample is rotated, in a case where the sample in which an optical film including a liquid crystal cured layer and a support not including a liquid crystal cured layer are laminated while being shifted by 90° is observed under a crossed Nicols condition using a transmission mode of a polarizing microscope.

Based on the results, evaluation was performed according to the following standard.

The results are shown in Table 1.

A: There is no cissing.
B: There are 1 or more and less than 30 cissings.
C: There are 30 or more and less than 60 cissings.
D: There are 60 or more cissings.

[Evaluation of Aligning Properties]

<Observation Method for Optical Films Prepared in Examples 1 to 12 and 14 to 17 and Comparative Examples 1 and 2>

The prepared optical film observed using a polarization microscope in a state where the liquid crystal-coated surface of the optical film was set on the objective lens side, the longitudinal direction of the optical film was set to 0°, the upper polarizer was set to 20°, and the lower polarizer was set to 315°.

A state where a partial difference in brightness and color upon observation did not exist was evaluated as a case where the liquid crystal director is uniformly aligned (excellent aligning properties).

<Observation Method for Optical Film Prepared in Example 13>

The produced optical film was observed using a polarizing microscope in a state of being shifted by 2 degrees from the extinction position.

A state where a partial difference in brightness upon observation did not exist was evaluated as a case where the liquid crystal director is uniformly aligned (excellent aligning properties).

<Observation Method for Optical Films Prepared in Example 18 and 19>

In the prepared optical film, the alignment of the cholesteric layer was confirmed by SEM observation, and the evaluation was performed according to the following criteria.

<Evaluation Method>

The results of observation performed by the observation method were classified in light of the following criteria.

The results are shown in Table 1.
A: The liquid crystal director is finely arranged and aligned, and the display performance is very excellent.
B: The liquid crystal director is uniformly arranged and aligned, and the display performance is excellent.
C: The liquid crystal directors are partially misaligned, and the plane state is stable. D: The liquid crystal director is significantly disordered, the plane state is unstable, and thus the display performance is very poor.

[Evaluation of Unevenness of Liquid Crystal Cured Layer]

The liquid crystal composition was applied to an 18×30 cm base material which had not been subjected to a rubbing treatment, and wind at a wind speed of 1.0 μm/min was applied for 30 seconds from 10 to 40 seconds after the coating in a direction parallel to the base material and in the same direction as the coating direction.

Thereafter, the film was interposed between two polarizing plates arranged in a crossed Nicol state, light was transmitted from the lower side to the upper side (the side facing the observer), unevenness of color and brightness was observed after 80 seconds from the coating, and evaluation was performed according to the following criteria.

The results are shown in Table 1.
A: Strong unevenness is visually recognized on the entire surface
B: Weak unevenness is visually recognized on the entire surface.
C: Weak unevenness is visually recognized partially.
D: Unevenness is not visually recognized on the entire surface.

TABLE 1

| | | Copolymer (Surfactant) | | | | | | | Evaluation | | |
|---|---|---|---|---|---|---|---|---|---|---|---|
| | | Repeating unit A | | Repeating unit B | | Repeating unit C | | | | | |
| | No. | Type | % by mass | Type | % by mass | Type | % by mass | Mw | Cissing | Arrangement | Unevenness |
| Example 1 | 101 | K-1 | 60 | Q-1 | 40 | | | 20,200 | A | A | A |
| Example 2 | 102 | K-2 | 60 | Q-1 | 40 | | | 21,000 | A | A | B |
| Example 3 | 103 | K-1 | 40 | Q-1 | 60 | | | 19,800 | A | A | C |
| Example 4 | 104 | K-4 | 60 | Q-1 | 40 | | | 19,500 | A | A | C |
| Example 5 | 105 | K-1 | 92 | Q-1 | 8 | | | 19,800 | B | B | A |
| Example 6 | 106 | K-1 | 60 | Q-1 | 40 | | | 38,200 | B | A | A |
| Example 7 | 107 | K-1 | 60 | Q-1 | 40 | | | 41,800 | B | B | A |
| Example 8 | 108 | K-1 | 60 | Q-1 | 40 | | | 10,600 | A | A | B |
| Example 9 | 109 | K-1 | 60 | Q-1 | 40 | | | 9,200 | A | A | C |
| Example 10 | 110 | K-1 | 60 | Q-5 | 40 | | | 20,900 | C | A | A |
| Example 11 | 111 | K-19 | 60 | Q-1 | 40 | | | 20,900 | A | A | A |
| Example 12 | 112 | K-1 | 75 | Q-22 | 25 | | | 20,700 | A | A | A |
| Example 13 | 113 | K-1 | 60 | Q-1 | 40 | | | 20,200 | A | A | A |
| Example 14 | 114 | K-1 | 60 | Q-8 | 40 | | | 19,800 | A | B | A |
| Example 15 | 115 | K-1 | 60 | Q-26 | 40 | | | 20,500 | A | A | A |
| Example 16 | 116 | K-1 | 60 | Q-9 | 40 | | | 19,700 | B | A | A |
| Example 17 | 117 | K-1 | 60 | Q-31 | 40 | | | 18,900 | A | A | A |
| Example 18 | 118 | K-1 | 60 | Q-8 | 40 | | | 21,000 | A | A | A |
| Example 19 | 119 | K-1 | 60 | Q-26 | 40 | | | 20,500 | A | B | A |
| Example 20 | 120 | K-1 | 65 | Q-33 | 15 | AA※ | 20 | 15,000 | A | A | A |
| Comparative Example 1 | C-1 | SiP-1※ | 60 | Q-1 | 40 | | | 29,000 | D | C | B |
| Comparative Example 2 | C-2 | K-1 | 92 | St※ | 8 | | | 21,200 | D | D | A |

※AA: acrylic acid (manufactured by FUJIFILM Wako Pure Chemical Corporation)
※SiP-1: manufactured by Shin-Etsu Chemical Co., Ltd., product name KF-2012 (molecular weight 4,200)
※St: styrene (manufactured by FUJIFILM Wako Pure Chemical Corporation)

From the results shown in Table 1, it was found that in a case where a repeating unit not having two or more structures (branched Si structures) each represented by Formula (Ia) was used as the repeating unit A of the surfactant, cissing occurred during the formation of the liquid crystal cured layer and the alignment properties of the liquid crystal cured layer to be formed were deteriorated (Comparative Example 1).

In addition, it was found that in a case where a repeating unit including only one ring structure consisting of a cycloalkane ring or a monocyclic aromatic ring was used as the repeating unit B of the surfactant, cissing occurred during the formation of the liquid crystal cured layer, and the alignment properties of the liquid crystal cured layer to be formed was deteriorated (Comparative Example 2).

On the other hand, it was found that in a case where the specific surfactant was blended, cissing was suppressed during the formation of the liquid crystal cured layer, and a liquid crystal cured layer having excellent alignment properties could be formed (Examples 1 to 19). In particular, from the comparison between Example 1 and Example 2, it was found that in a case where the repeating unit A includes three or more structures each represented by Formula (Ia), unevenness was suppressed during the formation of the liquid crystal cured layer. In addition, from the comparison between Example 1 and Example 3, it was found that in a case where the content of the repeating unit A is 50% by mass or more, unevenness was suppressed during the formation of the liquid crystal cured layer.

In addition, from the comparison between Example 1 and Example 5, it was found that in a case where the content of the repeating unit A is 90% by mass or less, cissing during the formation of the liquid crystal cured layer was further suppressed and the alignment properties of the liquid crystal cured layer were further improved.

In addition, from the comparison between Example 1 and Example 4, it was found that in a case where all $R^{11}$, $R^{12}$, and $R^{13}$ in Formula (Ia) were alkyl groups, unevenness was suppressed during the formation of the liquid crystal cured layer.

In addition, from the comparison of Example 1 and Examples 6 to 9, it was found that in a case where the weight-average molecular weight of the specific surfactant (specific copolymer) was 10,000 or more, unevenness was suppressed during the formation of the liquid crystal cured layer, and in a case where the weight-average molecular weight was 40,000 or less, the alignment properties of the liquid crystal cured layer were further improved.

In addition, from the comparison between Example 10 and Example 15, it was found that in a case where the mesogen group in Formula (b2) was a mesogen group represented by Formula (M1-A), cissing was further suppressed during the formation of the liquid crystal cured layer.

In addition, from the comparison of Examples 14 to 17, it was found that in a case where the linking position of the phenyl group at the center was a meta position, both the horizontal alignment and cissing of the liquid crystal cured layer were good.

In addition, from the comparison of Examples 18 and 19, it was found that in a case where the linking position of the phenyl group at the center was a para position, the vertical alignment of the cholesteric liquid crystal cured layer was good.

EXPLANATION OF REFERENCES

10: optical film
12: liquid crystal cured layer
14: alignment film
16: support

What is claimed is:

1. A liquid crystal composition comprising:
a liquid crystal compound; and
a surfactant,
wherein the surfactant is a copolymer having a repeating unit A represented by Formula (a1) and a repeating unit B including two or more ring structures, the ring structures being a cycloalkane ring or a monocyclic aromatic ring, and at least one of the ring structures being a monocyclic aromatic ring,

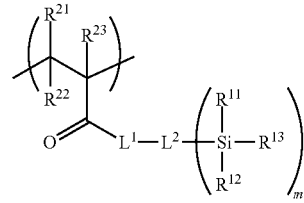

in Formula (a1),
m represents an integer of 2 or more,
$R^{11}$, $R^{12}$, and $R^{13}$ each independently represent an alkyl group, an alkenyl group, an aryl group, or an alkylenearyl group, provided that a plurality of $R^{11}$'s may be the same as or different from each other, a plurality of $R^{12}$'s may be the same as or different from each other, and a plurality of $R^{13}$'s may be the same as or different from each other,
$R^{21}$ and $R^{22}$ each independently represent a hydrogen atom or an alkyl group,
$R^{23}$ represents a hydrogen atom or a substituent,
$L^1$ represents —O— or —$NR^Z$—, provided that $R^Z$ represents a hydrogen atom or a substituent, and
$L^2$ represents an (m+1)-valent linking group.

2. The liquid crystal composition according to claim 1, wherein all $R^{11}$, $R^{12}$, and $R^{13}$ in Formula (a1) represent an alkyl group.

3. The liquid crystal composition according to claim 1, wherein a content of the repeating unit A included in the copolymer is 50% to 90% by mass with respect to a total mass of the repeating unit A and the repeating unit B.

4. The liquid crystal composition according to claim 1, wherein a weight-average molecular weight of the copolymer is 10,000 or more and 40,000 or less.

5. The liquid crystal composition according to claim 1, wherein the liquid crystal compound is a polymerizable liquid crystal compound.

6. The liquid crystal composition according to claim 5, wherein the polymerizable liquid crystal compound is at least one polymerizable liquid crystal compound selected from the group consisting of a polymerizable rod-shaped liquid crystal compound and a polymerizable disk-shaped liquid crystal compound.

7. A liquid crystal cured layer obtained by immobilizing an alignment state of the liquid crystal composition according to claim 1.

8. An optical film comprising:
the liquid crystal cured layer according to claim 7.

9. A polarizing plate comprising:
the optical film according to claim 8; and
a polarizer.

10. An image display device comprising:
the optical film according to claim 8.

* * * * *